United States Patent
Murphy et al.

(10) Patent No.: US 10,015,046 B2
(45) Date of Patent: *Jul. 3, 2018

(54) METHODS AND APPARATUS FOR A SELF-ORGANIZED LAYER-2 ENTERPRISE NETWORK ARCHITECTURE

(71) Applicant: Juniper Networks, Inc., Sunnyvale, CA (US)

(72) Inventors: James Murphy, Alameda, CA (US); Nischal Sheth, Los Altos, CA (US); Abhijit Choudhury, Cupertino, CA (US); Raghavendra Mallya, Cupertino, CA (US); Pranay Pogde, Sunnyvale, CA (US); Phalguni Nanda, San Jose, CA (US); Jayabharat Boddu, Los Altos, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,860

(22) Filed: May 5, 2017

(65) Prior Publication Data

US 2017/0279675 A1    Sep. 28, 2017

Related U.S. Application Data

(63) Continuation of application No. 13/252,854, filed on Oct. 4, 2011, now Pat. No. 9,667,485.

(51) Int. Cl.
*H04L 12/28* (2006.01)
*H04L 12/24* (2006.01)
(Continued)

(52) U.S. Cl.
CPC ......... *H04L 41/0809* (2013.01); *H04W 12/06* (2013.01); *H04L 41/0853* (2013.01); *H04L 63/162* (2013.01); *H04W 84/18* (2013.01)

(58) Field of Classification Search
CPC ............... H04L 41/0809; H04L 63/162; H04L 41/0853; H04W 12/06; H04W 84/18
(Continued)

(56) References Cited

U.S. PATENT DOCUMENTS 7,039,053 B1    5/2006    Freed et al.
7,068,624 B1    6/2006    Dantu et al.
(Continued)

FOREIGN PATENT DOCUMENTS

CN    1825798 A    8/2006
CN    101674249 A    3/2010
(Continued)

OTHER PUBLICATIONS

Michael Bahr, "Update on the Hybrid Wireless Mesh Protocol of IEEE 802.11s," Siemens Corporate Technology, Information & Communications, IEEE 1-4244-1455-5/07, © 2007, 6 pages.
(Continued)

*Primary Examiner* — Faisal Choudhury
(74) *Attorney, Agent, or Firm* — Cooley LLP

(57) ABSTRACT

In some embodiments, an apparatus includes a network node operatively coupled within a network. The network node is configured to send a first authentication message upon boot up, and receive, in response to the first authentication message, a second authentication message configured to be used to authenticate the network node. The network node is configured to send a first discovery message, and receive, based on the first discovery message, a second discovery message configured to be used by the network node to identify an address of the network node and an address of a (Continued)

core network node within the network. The network node is configured to set up a control-plane tunnel to the core network node based on the address of the network node and the address for the core network node and receive configuration information from the core network node through the control-plane tunnel.

18 Claims, 6 Drawing Sheets

(51) Int. Cl.
  *H04W 12/06* (2009.01)
  *H04L 29/06* (2006.01)
  *H04W 84/18* (2009.01)

(58) Field of Classification Search
  USPC .......................................................... 370/254
  See application file for complete search history.

(56) References Cited

U.S. PATENT DOCUMENTS

| | | | |
|---|---|---|---|
| 7,149,229 B1 | 12/2006 | Leung | |
| 7,792,985 B2 | 9/2010 | Liu | |
| 7,992,201 B2 | 8/2011 | Aldridge et al. | |
| 8,200,798 B2* | 6/2012 | Yadav | H04L 29/12028 370/392 |
| 8,233,455 B2 | 7/2012 | Shaheen et al. | |
| 9,521,549 B2* | 12/2016 | Lundstrom | H04W 8/26 |
| 2002/0071427 A1 | 6/2002 | Schneider et al. | |
| 2002/0191572 A1 | 12/2002 | Weinstein et al. | |
| 2002/0194367 A1 | 12/2002 | Nakamura et al. | |
| 2004/0264388 A1* | 12/2004 | Rover | H04L 41/00 370/254 |
| 2005/0060390 A1 | 3/2005 | Vakil et al. | |
| 2005/0265365 A1 | 12/2005 | Wan | |
| 2007/0064673 A1 | 3/2007 | Bhandaru et al. | |
| 2007/0153738 A1 | 7/2007 | Barker, Jr. et al. | |
| 2007/0206537 A1 | 9/2007 | Cam-Winget et al. | |
| 2007/0250713 A1 | 10/2007 | Rahman et al. | |
| 2007/0253432 A1 | 11/2007 | Regale et al. | |
| 2007/0268878 A1 | 11/2007 | Clements | |
| 2008/0046565 A1 | 2/2008 | Liu | |
| 2008/0049624 A1 | 2/2008 | Ray et al. | |
| 2008/0084888 A1* | 4/2008 | Yadav | H04L 45/02 370/395.31 |
| 2008/0107070 A1 | 5/2008 | Sastry | |
| 2008/0225853 A1 | 9/2008 | Melman et al. | |
| 2008/0259938 A1 | 10/2008 | Keene et al. | |
| 2009/0003313 A1 | 1/2009 | Busch et al. | |
| 2009/0059848 A1 | 3/2009 | Khetawat et al. | |
| 2009/0073989 A1 | 3/2009 | Cai et al. | |
| 2009/0161590 A1 | 6/2009 | Lewis | |
| 2009/0201898 A1 | 8/2009 | Gong et al. | |
| 2009/0252133 A1* | 10/2009 | Watanabe | H04W 28/08 370/338 |
| 2009/0274135 A1 | 11/2009 | Seok | |
| 2009/0303880 A1 | 12/2009 | Maltz et al. | |
| 2009/0310535 A1 | 12/2009 | Anumala et al. | |
| 2009/0316604 A1 | 12/2009 | Singh et al. | |
| 2010/0020717 A1 | 1/2010 | McGregor et al. | |
| 2010/0054207 A1 | 3/2010 | Gupta et al. | |
| 2010/0057907 A1 | 3/2010 | Ross et al. | |
| 2010/0080200 A1 | 4/2010 | Stewart | |
| 2010/0180016 A1 | 7/2010 | Bugwadia et al. | |
| 2010/0189118 A1 | 7/2010 | Nonaka | |
| 2010/0246545 A1 | 9/2010 | Berzin | |
| 2010/0250733 A1 | 9/2010 | Turanyi et al. | |
| 2010/0260146 A1 | 10/2010 | Lu | |
| 2010/0281251 A1 | 11/2010 | Arauz Rosado | |
| 2010/0290398 A1 | 11/2010 | Choudhary et al. | |
| 2010/0293293 A1 | 11/2010 | Beser | |
| 2010/0306408 A1 | 12/2010 | Greenberg et al. | |
| 2011/0103284 A1 | 5/2011 | Gundavelli et al. | |
| 2011/0116442 A1 | 5/2011 | Caldwell et al. | |
| 2011/0117946 A1 | 5/2011 | Vainola et al. | |
| 2011/0134797 A1 | 6/2011 | Banks et al. | |
| 2011/0161657 A1 | 6/2011 | So | |
| 2011/0182172 A1 | 7/2011 | Kulkarni | |
| 2011/0270996 A1* | 11/2011 | Kim | H04L 61/2575 709/227 |
| 2012/0063451 A1 | 3/2012 | Keesara et al. | |
| 2012/0198516 A1 | 8/2012 | Lim | |
| 2012/0198518 A1 | 8/2012 | Faith et al. | |
| 2013/0011136 A1 | 1/2013 | Hao | |
| 2013/0028079 A1 | 1/2013 | Paredes | |
| 2013/0083691 A1 | 4/2013 | Murphy et al. | |
| 2013/0083700 A1 | 4/2013 | Sindhu et al. | |
| 2013/0083724 A1 | 4/2013 | Sindhu et al. | |
| 2013/0083725 A1 | 4/2013 | Mallya et al. | |
| 2013/0083782 A1 | 4/2013 | Murphy et al. | |

FOREIGN PATENT DOCUMENTS

| | | |
|---|---|---|
| CN | 101888625 A | 11/2010 |
| EP | 2252096 A1 | 11/2010 |
| WO | WO2010/068018 A2 | 6/2010 |
| WO | WO2011/056334 A1 | 5/2011 |
| WO | WO2011056334 A | 5/2011 |

OTHER PUBLICATIONS

Myung J. Lee et al., Wireless Mesh Networking, "Emerging Standards for Wireless Mesh Technology," IEEE Wireless Communications, Apr. 2006 (pp. 56-63).

Krishna Sankar et al. "Cisco Wireless LAN Security Expert guidance for securing your 802.11 networks," Chapter 9, SWAN: End-to-End Security Deployment, Copyright 2005, Cisco Systems, Inc., Cisco Press, pp. 233-253.

Tarek Saad et al. "Tunneling Techniques for End-to-End VPNs: Generic Deployment in an Optical Testbed Environment" Broadband Networks, 2005 2nd International Conference, Boston, MA, Oct. 3-7, 2005, IEEE, Oct. 3, 2005, ISBN 978-0-7803-9276-2, pp. 924-930.

Albert Greenberg et al. "Towards a Next Generation Data Center Architecture: Scalability and Commoditization" SIGCOMM '08: Proceedings of the 2008 SIGCOMM Conference and Co-Located Workshops NSDR'08, WOSN'08, MOBIARCH'08, NETECON'08, & PRESTO'08; Seattle, WA, Aug. 17-22, 2008, New York, NY: ACM, Aug. 17, 2008, ISBN: 978-1-60558-181-1, pp. 57-62.

Greenberg A. et al. "VL2: a scalable and flexible data center network," SIGCOMM 2009, Aug. 17-21, 2009, Barcelona, Spain, ACM, New York, NY, ISBN: 978-1-60558-594-9, vol. 39, No. 4, Aug. 17, 2009, pp. 51-62.

Linda Dunbar: "Directory Server Assisted TRILL edge", Mar. 7, 2011, Retrieved from the internet: URL: <http://tools.jetf.org/pdf/draft-dunbar-trill-server-assisted-edge-00.pdf> [Retrieved on Sep. 30, 2011], 7 pages.

R. Droms, "RFC 2131—Dynamic Host Configuration Protocol," Internet Citation, Retrieved from the Internet <URL: http:www.ieft.org/rfc/rfc2131.txt> [retrieved on Mar. 14, 2002], Mar. 1997 (45 pages).

M. Patrick, Motorola BSC "DHCP Relay Agent Information Option," rfc3046.txt, internet X.509 Public Key Infrastructure Certificate and Certificate Revocation List (CRL) Profile; RFC5280.txt, Internet Society (ISOC) 4, Rue Des Falaiscs CH-1205 Geneva, Switzerland, CH, Jan. 1, 2001 (15 pages).

W, Wimer, Carnegie Mellon University, "Clarifications and Extensions for the Bootstrap Protocol," rfc1542.txt, Internet X.509 Public Key Infrastructure Certificate and Certificate Revocation List (CRL) Profile; RFC5280.txt, Internet Society (ISOC) 4, Rue Des Falaises CH-1205 Geneva, Switzerland, CH, Oct. 1, 1993 (23 pages).

Office Action for U.S. Appl. No. 13/252,852, dated Apr. 23, 2013.

Final Office Action for U.S. Appl. No. 13/252,852, dated Oct. 25, 2013.

Office Action for U.S. Appl. No. 13/252,852, dated Aug. 5, 2014.

(56) References Cited

OTHER PUBLICATIONS

Final Office Action for U.S. Appl. No. 13/252,852, dated Feb. 23, 2015.
Office Action for U.S. Appl. No. 13/252,852, dated Jul. 13, 2015.
Office Action for U.S. Appl. No. 13/252,852, dated Nov. 4, 2015.
Office Action for U.S. Appl. No. 15/196,676, dated Dec. 30, 2016.
Office Action for U.S. Appl. No. 13/252,856, dated Oct. 11, 2013.
Office Action for U.S. Appl. No. 14/454,193, dated Jan. 7, 2015.
Final Office Action for U.S. Appl. No. 14/454,193, dated Sep. 15, 2015.
Non-Final Office Action for U.S. Appl. No. 13/252,857, dated Dec. 13, 2013.
Final Office Action for U.S. Appl. No. 13/252,857, dated Jul. 25, 2014.
Office Action for U.S. Appl. No. 13/252,860, dated Jan. 16, 2015.
Final Office Action for U.S. Appl. No. 13/252,860, dated Jul. 1, 2015.
Office Action for U.S. Appl. No. 13/252,860, dated Jan. 12, 2016.
Final Office Action for U.S. Appl. No. 13/252,860, dated Jun. 14, 2016.
Office Action for U.S. Appl. No. 13/252,860, dated Mar. 29, 2017.
Non-Final Office Action for U.S. Appl. No. 13/618,684, dated Jan. 31, 2014.
Final Office Action for U.S. Appl. No. 13/618,684, dated Sep. 8, 2014.
Office Action for U.S. Appl. No. 13/618,684, dated Jan. 30, 2015.
Final Office Action for U.S. Appl. No. 13/618,684, dated Sep. 14, 2015.
Office Action for U.S. Appl. No. 13/618,684, dated Jul. 22, 2016.
Final Office Action for U.S. Appl. No. 13/618,684, dated Jan. 9, 2017.
Extended Search Report for European Application No. 12169451.7, dated Dec. 12, 2012.
First Office Action for Chinese Application No. 201210174345.X, dated Dec. 1, 2014.
Second Office Action for Chinese Application No. 201210174345.X, dated Aug. 10, 2015.
Rejection Decision for Chinese Application No. 201210174345.X, dated Feb. 15, 2016.
Board Opinion for Chinese Application No. 201210174345.X, dated Nov. 25, 2016.
Second Board Opinion for Chinese Application No. 201210174345.X, dated Apr. 26, 2017.
Reexamination Notification for Chinese Application No. 201210174345.X, dated Nov. 25, 2016.
Extended Search Report for European Application No. 12168436.9, dated Oct. 25, 2013.
Examination Report for European Application No. 12168436.9, dated Apr. 26, 2017.
First Office Action for Chinese Application No. 201210173178.7, dated Jan. 7, 2015.
Second Office Action for Chinese Application No. 201210173178.7, dated Sep. 11, 2015.
Third Office Action for Chinese Application No. 201210173178.7, dated Apr. 5, 2016.
Fourth Office Action for Chinese Application No. 201210173178.7, dated Jan. 5, 2017.
Extended Search Report for European Application No. 12169903.7, dated Jan. 7, 2013.
Office Action for European Application No. 12169903.7, dated Jun. 3, 2014.
Office Action for European Application No. 12169903.7, dated Jan. 16, 2017.
First Office Action for Chinese Application No. 201210173641.8, dated Feb. 12, 2015.
Second Office Action for Chinese Application No. 201210173641.8, dated Jul. 28, 2015.
Office Action for U.S. Appl. No. 13/252,860, dated Oct. 16, 2017.
Advisory Action for U.S. Appl. No. 13/618,684, dated Jul. 11, 2017.
Office Action for European Application No. 12169451.7, dated Jul. 3, 2017.
Reexamination Decision for Chinese Application No. 201210174345.X, dated Sep. 21, 2017.

* cited by examiner

METHODS AND APPARATUS FOR A SELF-ORGANIZED LAYER-2 ENTERPRISE NETWORK ARCHITECTURE

CROSS-REFERENCE TO RELATED APPLICATIONS

This application is a continuation of U.S. patent application Ser. No. 13/252,854, filed Oct. 4, 2011 and entitled, "Methods and Apparatus for a Self-Organized Layer-2 Enterprise Network Architecture" (now U.S. Pat. No. 9,667,485). This application is also related to U.S. patent application Ser. No. 13/252,852, filed Oct. 4, 2017, and entitled "Apparatuses for a Wired/Wireless Network Architecture" (now U.S. Pat. No. 9,407,457); U.S. patent application Ser. No. 13/252,856, filed Oct. 4, 2011, and entitled "Methods and Apparatus for Enforcing a Common User Policy within a Network" (now U.S. Pat. No. 8,804,620); U.S. patent application Ser. No. 13/252,860, filed Oct. 4, 2011, and entitled "Methods and Apparatus for Centralized Management of Access and Aggregation Network Infrastructure;" and U.S. patent application Ser. No. 13/252,857, filed Oct. 4, 2011, and entitled "Methods and Apparatus for a Scalable Network with Efficient Link Utilization" (now U.S. Pat. No. 9,118,687), each of which is incorporated herein by reference in its entirety.

BACKGROUND

Some embodiments described herein relate generally to enterprise networks, and, in particular, to methods and apparatus for self-organizing layer-2 network elements in an enterprise network architecture.

In some known enterprise networks, each layer-2 network element in a given enterprise network is individually and manually configured, for example, by a network administrator. Because the number of such layer-2 network elements can grow into the thousands in a large deployment of enterprise network, the configuration burden can become significant and error prone for the network administrator. Additionally, the implications and effectiveness of configuration changes in the layer-2 network elements are difficult to comprehend in a largely distributed enterprise network.

Accordingly, a need exists for an enterprise network architecture that enables both wired and wireless layer-2 network elements to be self-organized in an enterprise network.

SUMMARY

In some embodiments, an apparatus comprises a network node operatively coupled within a network including a set of network nodes and a core network node. The network node is configured to send a first authentication message upon boot up, and receive a second authentication message in response to the first authentication message. The network node is configured to be authenticated based on the second authentication message. The network node is configured to send a first discovery message, and receive a second discovery message based on the first discovery message. The network node is configured to identify an address of the network node and an address of the core network node based on the second discovery message. The network node is configured to set up a control-plane tunnel to the core network node based on the address of the network node and the address for the core network node and receive configuration information from the core network node through the control-plane tunnel.

DETAILED DESCRIPTION

Figure 1:
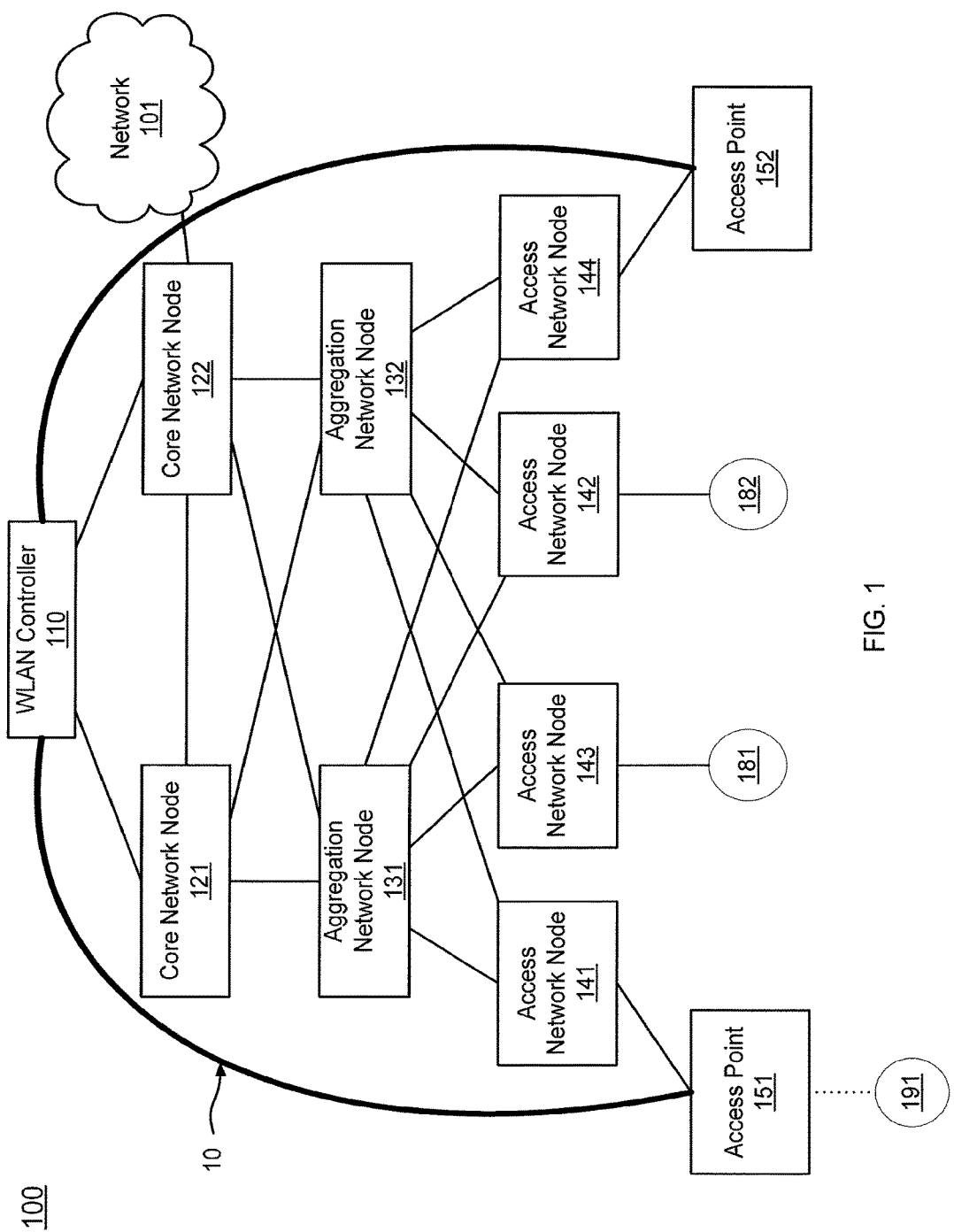
FIG. 1 is a schematic illustration of an overlay enterprise network having access points, access network nodes, aggregation network nodes, core network nodes, and a WLAN controller.

In some embodiments, an enterprise network includes a network node from a set of network nodes that is operatively coupled to a core network node. The set of network nodes can include a set of wireless nodes and a set of wired nodes. The network node is configured to send a first authentication message within the enterprise network upon boot up, and then receive a second authentication message in response to the first authentication message. The network node is configured to be authenticated based on the second authentication message. After being authenticated, the network node is configured to send a first discovery message, and then receive a second discovery message based on the first discovery message. The network node is configured to identify an address of the network node and an address of the core network node based on the second discovery message. The network node is configured to set up a control-plane tunnel with the core network node based on the address of the network node and the address of the core network node. Furthermore, the network node is configured to receive configuration information from the core network node through the control-plane tunnel. In some embodiments, the first authentication message and the first discovery message are sent by the network node without intervention from a network administrator. The configuration information is received by the network node without intervention from a network administrator either.

In some embodiments, the network node can be an access network node operatively coupled to an aggregation network node from the set of network nodes. In such embodiments, the network node is configured to send the first authentication message to and receive the second authentication message from the aggregation network node, and also receive the configuration information from the core network node through the aggregation network node via the control-plane tunnel. In some other embodiments, the network node can be an access point operatively coupled to an access network node from the set of network nodes. In such embodiments, the network node is configured to send the first authentication message to and receive the second authentication message from the access network node, and also receive the configuration information from the core network node through the access network node and an aggregation network node from the set of network nodes via the control-plane tunnel.

Additionally, the network node is configured to send a first set of topology messages to a set of network nodes, and then receive a second set of topology messages from the set of network nodes. Thus, the network node is configured to define a network topology based on the second set of topology messages, and also configured to automatically configure itself based on the configuration information and the network topology. Furthermore, the network node is configured to send a first set of routing messages to a set of network nodes, and then receive a second set of routing messages from the set of network nodes. Thus, the network node is configured to receive data-plane packets from the core network node through a data-plane tunnel based on the second set of routing messages.

In some embodiments, an enterprise network includes a core network node operatively coupled to a set of network nodes. The core network node is configured to receive a first authentication message from an aggregation network node from the set of network nodes in response to a booting sequence at the aggregation network node, and then send a second authentication message to the aggregation network node such that the aggregation network node is authenticated in response to the second authentication message. The core network node is also configured to set up a control-plane tunnel with to a network node from the set of network nodes through the aggregation network node based on an address of the core network node and an address of the network node. The core network node is configured to send subsequently configuration information to the network node through the control-plane tunnel. After sending the configuration information to the network node, the core network node is configured to send data-plane packets to the network node through the aggregation network node via a data-plane tunnel.

In some embodiments, the network node can be an access network node connected to the aggregation network node, or an access point connected to an access network node that is connected to the aggregation network node. In some embodiments, the core network node is configured to send configuration information to an access network node through a first control-plane tunnel via the aggregation network node, and send configuration information to an access point through a second control-plane tunnel via the aggregation network node and the access network node.

FIG. 1 is a schematic illustration of an overlay enterprise network 100 having access points (e.g., access point 151, access point 152), access network nodes (e.g., access network node 141-144), aggregation network nodes (e.g., aggregation network node 131, aggregation network node 132), core network nodes (e.g., core network node 121, core network node 122), and a WLAN (wireless local area network) controller 110. In such an overlay enterprise network, typically network devices including access points, access network nodes and aggregation network nodes are individually and manually configured, as described in detail below.

A core network node (e.g., core network node 121, core network node 122) can be a high-capacity switching device positioned in the physical core, or backbone, of an enterprise network (e.g., the overlay enterprise network 100). In some cases, a core network node is known as a core switch, a tandem switch or a backbone switch. In the overlay enterprise network 100, core network node 121 and core network node 122 are configured to connect the access devices (e.g., access network node 141-144, access point 151-152) and WLAN controller 110 with network 101, such that access to information services (e.g., persistent data and applications) located at network 101 can be provided to users that are coupled to overlay enterprise network 100 via wired or wireless host devices (e.g., wired host device 181, wired host device 182, wireless host device 191). Specifically, core network node 121 and core network node 122 operatively connect aggregation network node 131 and aggregation network node 132 with network 101, and forward packets of wired and/or wireless sessions between aggregation network node 131, aggregation network node 132 and network 101 based on IP routing services. In other words, core network node 121 and core network node 122 act as a router working in layer 3 (i.e., network layer) of the OSI (open systems interconnection) model for overlay enterprise network 100. In overlay enterprise network 100, the access network nodes manage the wired sessions, core network nodes are configured to switch or route wired sessions' traffic received from the aggregation network node(s), while wireless sessions are managed by WLAN controller 110, as described in detail below.

Shown in FIG. 1, network 101 can be any network that is directly connected to overlay enterprise network 100 through one or more core network nodes. For example, network 101 can be a data center network including one or more data servers that provide information services. For another example, network 101 can be a WAN (wide area network) access network that is used to connect the overlay enterprise network 100 to remote data resources. For yet another example, network 101 can be the Internet. Typically, the overlay enterprise network 100 acts as an access network providing, for wired or wireless clients, access to data resources, applications, and information services that are located at or provided from network 101.

In the overlay enterprise network 100, the access network nodes (e.g., access network node 141-144) can be any device that can directly connect one or more wired host devices (e.g., wired host device 181, wired host device 182) to the overlay enterprise network 100, such as a hub, an Ethernet switch, etc. In some cases, an access network node is also known as an Access network node, a network switch, or a switching hub. Furthermore, as described in detail herein, access network node 141-144 is configured to ensure packets are delivered between one or more aggregation network nodes, one or more wired host devices, and/or one or more access points that are coupled to the access network nodes. In the overlay enterprise network 100, a wired host device can be any device that can receive packets from and/or send packets to an access network node through a wired connection, such as a desktop computer, a workstation, a printer, etc.

In the overlay enterprise network 100, the aggregation network nodes (e.g., aggregation network node 131-132) can be any device that is used to aggregate multiple access network nodes and ensure packets are properly switched or routed within the network, such as a router, a layer-3 switch, etc. Furthermore, as described in detail herein, aggregation network node 131-132 is configured to route packets received from one or more access network nodes to another access network node or a core network node, based on the routing information provided in the packet and the routing policy implemented at aggregation network node 131-132.

In some embodiments, a collection of aggregation network nodes and associated access devices (e.g., access network nodes, access points) having a common connection to a redundant set of core network nodes are referred to as a pod. As shown in FIG. 1, aggregation network nodes 131-132 with their associated access network nodes 141-144 and access points 151-152 comprise a pod.

In the overlay enterprise network 100, core network node 121-122, aggregation network node 131-132, and access network node 141-144 are configured collectively to manage and forward wired traffic for one or more wired host devices that are operatively coupled to one or more access network nodes. Wired network nodes including access network nodes 141-144 and aggregation network nodes 131-132 are configured to switch or route packets of a wired session that are received from a wired host device, to another wired network node or a core network node, based on a destination address (e.g., a destination IP address, a destination MAC address) included in the packets. More specifically, some wired traffic that is received at an aggregation network node from an access network node may be switched or routed to another access network node from the aggregation network node if the traffic is destined to a destination device within the same pod. In contrast, the wired traffic destined to a destination device located in another pod is forwarded to a core network node, from which the traffic is forwarded into the other pod. For example, if wired host device 181 sends a packet to access network node 143 destined to wired host device 182, the packet can be first forwarded by access network node 143 to aggregation network node 131. Then, based on the destination IP address or MAC address included in the packet, the packet is further forwarded by aggregation network node 131 to access network node 142, which finally sends the packet to wired host device 182. For another example, if wired host device 181 sends a packet to access network node 143 destined to a device located in network 101, the packet can be first forwarded by access network node 143 to aggregation network node 131. Then, based on the destination IP address or MAC address included in the packet, the packet is further forwarded by aggregation network node 131 to core network node 122, which sends the packet into network 101 for further routing.

In the overlay enterprise network 100, wireless equipment, including WLAN controller 110 and access points 151-152, forward wireless traffic that is received from one or more wireless host devices (e.g., wireless host device 191). Specifically, WLAN controller 110 can be any device that can automatically handle the configuration of multiple access points, and act as a centralized controller configured to manage wireless sessions in an overlay of the wired network portion of overlay enterprise network 100. An access point can be any device that connects a wireless host device to a wired network (e.g., via an access network node as shown in FIG. 1) using, for example, Wi-Fi, Bluetooth or other wireless communication standards. In some cases, an access point can be located on the same device together with an access network node, such as a wireless Ethernet router equipped with a wireless transceiver. In some other cases, an access point can be a stand-alone device, such as a wireless access point (WAP). Similar to a wired host device, a wireless host device can be any device that can receive packets from and/or send packets to an access point through a wireless connection, such as, for example, a mobile phone, a Wi-Fi enabled laptop, a Bluetooth earphone, etc.

In the overlay enterprise network 100, WLAN controller 110 and access points 151-152 are configured collectively to manage and forward wireless traffic through intervening wired network nodes and core network nodes. Specifically, WLAN controller 110 is configured to receive encapsulated packets of a wireless session from access point 151 or access point 152 via an Ethernet-over-layer-3 tunnel through intervening wired network nodes and core network nodes, decapsulate the packets, and then bridge the decapsulated packets to core network node 121 or core network node 122, from which the decapsulated packets are further forwarded to the destination. Similarly, WLAN controller 110 is configured to receive packets of the wireless session from core network node 121 or core network node 122 destined to access point 151 or access point 152, encapsulate the packets according to an Ethernet-over-layer-3 tunneling protocol, and then send the encapsulated packets to access point 151 or access point 152 via an Ethernet-over-layer-3 tunnel through intervening wired network nodes and core network nodes, where the encapsulated packets are decapsulated and forwarded to a wireless host device. In some cases, an Ethernet-over-layer-3 tunnel can be a control and provisioning of wireless access points (CAPWAP) tunnel, a generic routing encapsulation (GRE) tunnel, etc.

In the overlay enterprise network 100, typically a network device (e.g., an access point, an access network node, an aggregation network node) is individually and manually configured, for example, by a network administrator (not shown in FIG. 1). Specifically, the network administrator can manually input configuration information (e.g., an Internet protocol (IP) address assigned to the network device, an IP address of a default gateway, etc.), topology information (e.g., information associated with neighboring network devices), and/or forwarding policy information into a memory of the network device. Thus, the network device can be configured accordingly, such that the network device can function appropriately as a network element in the overlay enterprise network 100 and provide network services to users operatively coupled to the network device.

For example, as shown in FIG. 1, access point 151 can be manually configured by a network administrator. Specifically, the network administrator can enter IP configuration information such as an IP address for access point 151, an IP address of WLAN controller 110, etc., into a memory of access point 151. The network administrator can also input topology information, such as information associated with access network node 141 that is directly coupled to access point 151, etc., into the memory of access point 151. Furthermore, the network administrator can input and configure forwarding policy information in a forwarding table stored in the memory of access point 151. As a result of all the manual configurations described above, a data-plane tunnel (e.g., an Ethernet-over-layer-3 tunnel) (shown as the tunnel represented by 10 in FIG. 1) between access point 151 and WLAN controller 110 can be established, and access point 151 can be configured to forward data packets to and/or receive data packets from WLAN controller 110 via the data-plane tunnel, as described in detail above.

For another example, as shown in FIG. 1, access network node 142 can be manually configured by a network administrator. Specifically, the network administrator can enter IP configuration information such as an IP address for access network node 143, an IP address of aggregation network node 131, an IP address of aggregation network node 132, etc., into a memory of access network node 142. The network administrator can also input topology information, such as information associated with aggregation network node 131 and aggregation network node 132 that are directly coupled to access network node 142, etc., into the memory of access network node 142. Furthermore, the network administrator can input and configure forwarding policy information in a forwarding table stored in the memory of access network node 142. As a result of all the manual configurations described above, two data-plane channels can be established between access network node 142 and aggregation network nodes 131-132, respectively. Access network node 142 can be configured to forward data packets to and/or receive data packets from aggregation network node 131 and/or aggregation network node 132, respectively, as described in detail above.

In an enterprise network, if every network device included in the enterprise network or a portion of the enterprise network can be controlled by one or more core network nodes, then that enterprise network can be referred to as a homogeneous enterprise network, or that portion of the enterprise network can be referred to as a homogeneous portion of the enterprise network. In such a homogeneous network or portion of the network it is possible to use MPLS tunneling technology to tunnel traffic (e.g., wired or wireless traffic). If not every network node included in a portion of the enterprise network can be controlled by one or more core network nodes, then that portion of the enterprise network is referred to as an overlay enterprise network portion. Additionally, in some embodiments, one or more network devices included in a homogeneous portion or an overlay enterprise network portion of an enterprise network can tunnel traffic using an Ethernet-over-layer-3 tunneling technology (e.g., CAPWAP, Ethernet-in-GRE). MPLS tunneling technology can be used only in the homogeneous portion.

Figure 2:
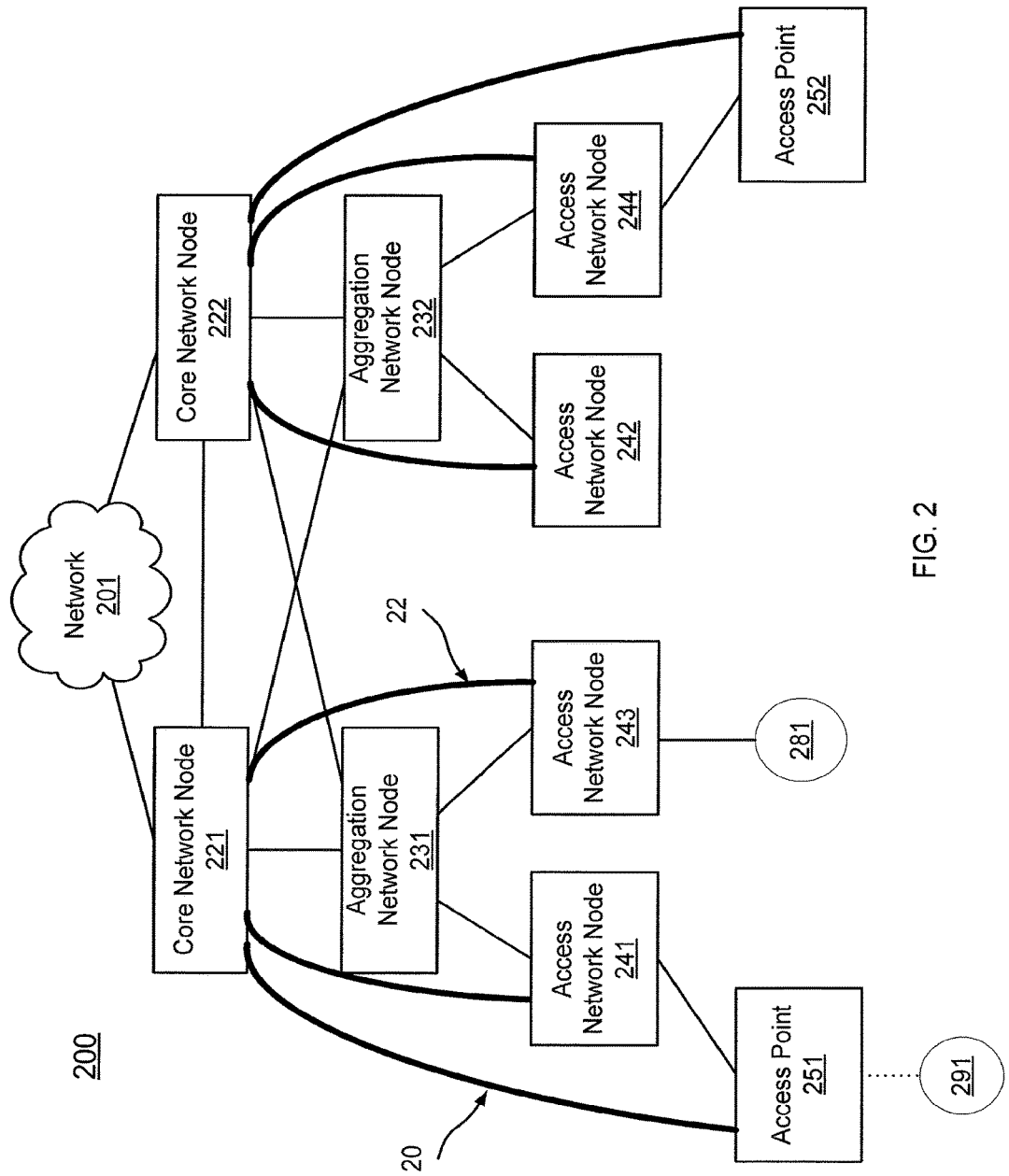
FIG. 2 is a schematic illustration of a homogeneous enterprise network having access points, access network nodes, aggregation network nodes, and core network nodes, according to an embodiment.

FIG. 2 is a schematic illustration of a homogeneous enterprise network 200 having access points (e.g., access point 251, access point 252), access network nodes (e.g., access network node 241-244), aggregation network nodes (e.g., aggregation network node 231, aggregation network node 232), and core network nodes (e.g., core network node 221, core network node 222), according to an embodiment. In such a homogeneous enterprise network, different from the overlay enterprise network 100, network devices including access points, access network nodes and aggregation network nodes are typically self-organized and automatically configured, as described in detail below.

In a homogeneous enterprise network, a common tunneling technology can be used to forward both the wired traffic and the wireless traffic in any portion of the homogeneous enterprise network. For example, as described in detail herein, the MPLS tunneling technology or an Ethernet-over-layer-3 tunneling technology can be used to forward both the wired traffic and the wireless traffic in any portion of the homogeneous enterprise network 200. In contrast, as described above with respect to FIG. 1, in an overlay enterprise network (e.g., the overlay enterprise network 100) an Ethernet-over-layer-3 tunneling technology can be used to forward the wireless traffic in the wireless overlay portion of the overlay enterprise network, while typically no tunneling technology (e.g., an Ethernet-over-layer-3 tunneling technology, the MPLS tunneling technology) is used to forward the wired traffic in the overlay enterprise network.

Figure 5:
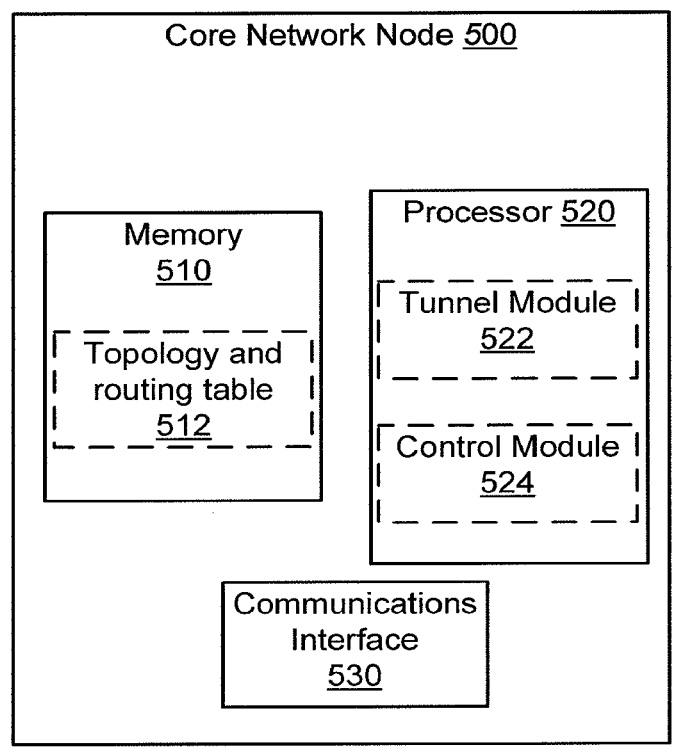
FIG. 5 is a system block diagram of a core network node, according to an embodiment.

A core network node in a homogeneous enterprise network (e.g., core network node 221 or core network node 222 in the homogeneous enterprise network 200) can be, for example, upgraded from a core network node in an overlay enterprise network (e.g., core network node 121 or core network node 122 in the overlay enterprise network 100). In such an upgrade, the core network node in a homogeneous enterprise network (e.g., core network node 221, core network node 222) is a single device that combines for example a switch, a router, and a controller, which includes a control module (e.g., control module 524 for core network node 500 as shown in FIG. 5) configured to manage wired/wireless network nodes and/or wired/wireless user sessions. In other words, core network node 221, 222 is a consolidation of at least a WLAN controller (e.g., WLAN controller 110) and a core network node from an overlay enterprise network. On one hand, similar to a core network node from an overlay enterprise network, core network node 221, 222 is still able to forward packets of wired sessions between an aggregation network node and a network that is operatively coupled to core network node 221, 222. On the other hand, unlike a core network node within an overlay enterprise network, core network node 221, 222 can establish a wired session with an access network node, or establish a wireless session with an access point, through intervening wired network nodes, via a tunnel (e.g., the MPLS tunnel, an Ethernet-over-layer-3 tunnel). Detail on tunneling of session data between a core network node and an access network node and/or an access point within a homogeneous enterprise network is described below. In some embodiments, a core network node in a homogeneous enterprise network is referred to as a core SRC (switch, router, and controller).

Similar to core network nodes 221-222, all other devices in the homogeneous enterprise network 200, including aggregation network node 231-232, access network node 241-244, and access point 251-252, can be configured to operate in a homogeneous enterprise network. Specifically, the functionality of access network node 241-244 and aggregation network node 231-232 includes multiplexing client traffic, including packets of wired and wireless sessions, to core network node 221 or core network node 222 without any need for local switching or complex forwarding and classification functionality. For example, unlike aggregation network nodes 131-132 in the overlay enterprise network 100, aggregation network node 231 does not need to be configured to switch or route a packet received from access network node 243 to another access network node based on a destination address included in the packet. Instead, aggregation network node 231 can be configured to forward the packet, through a portion of a tunnel between access network node 243 and core network node 221 (shown as the tunnel represented by 22 in FIG. 2), to core network node 221, from which the packet is further switched or routed to the destination. Similarly stated, access network nodes 241-244 are configured to transmit wired traffic to core network node 221 or core network node 222 via a tunnel (e.g., the tunnel represented by 22 in FIG. 2) through intervening aggregation network nodes 231-232. Access points 251-252 are configured to transmit wireless traffic to core network node 221 or core network node 222 via a tunnel (e.g., a tunnel represented by 20 in FIG. 2) through intervening access network nodes and aggregation network nodes. In addition, similar to network 101 shown in FIG. 1, network 201 is a network coupled to the homogeneous enterprise network 200 through core network node 221 and/or core network node 222, which provides access to data resources, applications, and/or information services, to clients that are operatively coupled to the homogeneous enterprise network 200. For example, network 201 can be a data center network, a WAN, the Internet, etc.

In an enterprise network, the tunneling technology applied between a core network node and an access device (e.g., an access network node, an access point) depends on the nature and/or capabilities of the core network node, the access device, and the intermediate network device(s) (e.g., aggregation network node) present between the core network node and the access device. Specifically, in an overlay enterprise network (e.g., the overlay enterprise network 100), typically no tunneling protocol can be used between a core network node and an access device. In a homogeneous enterprise network (e.g., the homogeneous enterprise network 200), a tunneling protocol such as MPLS or an Ethernet-over-layer-3 tunneling protocol can be used to forward both the wired traffic and the wireless traffic.

For example, if wireless host device 291 sends a packet to access point 251 destined to wired host device 281, the packet is first encapsulated according to MPLS or an Ethernet-over-layer-3 tunneling protocol at access point 251, and then transmitted to core network node 221 via a MPLS tunnel or an Ethernet-over-layer-3 tunnel through access network node 241 and aggregation network node 231 (shown as the tunnel represented by 20 in FIG. 2). Next, the encapsulated packet is decapsulated according to MPLS or the Ethernet-over-layer-3 tunneling protocol at core network node 221. Then based on a destination IP address or a destination MAC address included in the packet, the packet is encapsulated again according to MPLS or am Ethernet-over-layer-3 tunneling protocol at core network node 221, and the encapsulated packet is forwarded by core network node 221 to access network node 243 via another MPLS tunnel or another Ethernet-over-layer-3 tunnel through aggregation network node 231 (shown as the tunnel represented by 22 in FIG. 2). Finally, the encapsulated packet is decapsulated according to MPLS or the Ethernet-over-layer-3 tunneling protocol at access network node 243, from which the decapsulated packet is delivered to wired host device 281.

For another example, if wired host device 281 sends a packet to access network node 243 destined to an IP address located in network 201, the packet is first encapsulated according to MPLS or an Ethernet-over-layer-3 tunneling protocol at access network node 243, and then transmitted to core network node 221 via a MPLS tunnel or an Ethernet-over-layer-3 tunnel through aggregation network node 231 (shown as the tunnel represented by 22 in FIG. 2). Next, the encapsulated packet is decapsulated according to MPLS or the Ethernet-over-layer-3 tunneling protocol at core network node 221. Finally, based on a destination IP address included in the packet, the decapsulated packet is forwarded by core network node 221 to network 201, and further delivered to the destination entity associated with the destination IP address in network 201.

In some embodiments, a centralized core architecture can be implemented in a homogeneous enterprise network. As described in detail herein, core network nodes of the homogeneous enterprise network can provide a single point of configuration and management for all network services as well as a single logic node of interaction for visibility and monitoring applications. As a result, various types of service modules can be aggregated and/or consolidated at one or more core network nodes, such as firewall, intrusion detection policy (IDP), virtual private network (VPN) termination, and/or load balancing, etc. In such a homogeneous enterprise network, services no longer need to be distributed at various levels in the network, and users can be given a consistent policy that is independent of their access mechanism.

In the homogeneous enterprise network 200, unlike in the overlay enterprise network 100, network nodes including access points 251-252, access network nodes 241-244 and aggregation network nodes 231-232 can be self-organized and automatically configured without intervention from, for example, a network administrator. More specifically, network nodes can be self-organized in the sense that a user, for example, at a wireless communication device coupled to an access point or at a wired communication device coupled to an access network node, accesses and views the network as a layer-2 (L2) network via the tunnels between the user's communication device and the core network node. In other words, the virtual local area network(s) (VLAN) can be extended to any port on a network node or access point depending on where and how the user connects, resulting in the VLAN to be self-organized. Similarly, user policy is also self-organizing. More specifically, the access control policy for a given user (e.g., to network resources, to specific IP addresses) is maintained and configured at one or more core network nodes, and applied automatically by the enterprise network at an access network node or an access point as needed, depending on where and how the user connects to the network.

As a first step after booting up, a network node (e.g., an access point, an access network node, an aggregation network node) can be automatically authenticated. Specifically, the network node can be configured to send a first authentication message to a second network node (e.g., an access network node, an aggregation network node, a core network node) directly coupled to the network node, which has been configured and functioning as a network element of the homogeneous enterprise network 200. The first authentication message can be a message that requests the network node to be authenticated as a network element of the homogeneous enterprise network 200. In response to receiving the first authentication message, if the second network node is capable of authenticating the network node (e.g., an authentication server, not shown in FIG. 2), the second network node can be configured to generate and send a second authentication message to the network node, which authenticates the network node based on the first authentication message. Alternatively, if the second network node is not capable of authenticating the network node, the second network node can be configured to forward the first authentication message to a third network node (e.g., an authentication server, not shown in FIG. 2) that is capable of authenticating the network node. As a result, a second authentication message that authenticates the network node is sent from the third network node to the second network node, from which the second authentication message is forwarded to and applied accordingly at the network node. Thus, the network node is authenticated and allowed to access resources located on the homogeneous enterprise network 200 based on the second authentication message. In some embodiments, a network node can be automatically authenticated without intervention from a network administrator. In some embodiments, such an authentication procedure can be based on an authentication mechanism such as the port-based network access control (PNAC) protocol (i.e., IEEE 802.1x).

For example, as shown in FIG. 2, as a result of a booting sequence at aggregation network node 231, aggregation network node 231 is configured to send a first authentication message to core network node 221 or core network node 222 each of which is directly coupled to aggregation network node 231. The first authentication message provides credential information (e.g., a digital certificate, a MAC address, etc.) of aggregation network node 231 based on a protocol such as the PNAC protocol, and is sent from aggregation network node 231 to core network node 221 or core network node 222 without intervention from a network administrator. In response to receiving the first authentication message, core network node 221 or core network node 222 is configured to forward the credential information of aggregation network node 231 to an authentication server (not shown in FIG. 2) operatively coupled to core network node 221 or core network node 222 for verification. If the authentication server determines the credential information of aggregation network node 231 is valid, the authentication server can send a second authentication message that authenticates aggregation network node 231 based on a protocol such as the PNAC protocol to core network node 221 or core network node 222, which then forwards the second authentication message to aggregation network node 231. Thus, based on the second authentication message, aggregation network node 231 is authenticated and allowed to access resources located on the homogeneous enterprise network 200.

For another example, as shown in FIG. 2, as a result of a booting sequence at access point 251, access point 251 is configured to send a first authentication message to access network node 241 that is directly coupled to access point 251. The first authentication message provides credential information (e.g., a digital certificate, a MAC address, etc.) of access point 251 based on a protocol such as the PNAC protocol, and is sent from access point 251 without intervention from a network administrator. In response to receiving the first authentication message, access network node 241 is configured to forward the credential information of access point 251 to core network node 221, from which the credential information of access point 251 is further forwarded to an authentication server (not shown in FIG. 2) operatively coupled to core network node 221 for verification. If the authentication server determines the credential information of access point 251 is valid, the authentication server can send a second authentication message that authenticates access point 251 based on a protocol such as the PNAC protocol to core network node 221. The second authentication message is then forwarded by core network node 221 to access point 251 via access network node 241. Thus, based on the second authentication message, access point 251 is authenticated and allowed to access resources located on the homogeneous enterprise network 200.

After being authenticated, a network node can be configured to be auto-discovered. Specifically, the network node can be configured to send a first discovery message to a second network node directly coupled to the network node. The first discovery message can be a message that requests an address (e.g., an IP address) assigned to the network node, and other configuration information associated with the network node, such that the network node can be configured appropriately as a network element of the homogeneous enterprise network 200. In response to receiving the first discovery message, if the second network node is not a core network node, the second network node is configured to forward the first discovery message to a core network node operatively coupled to the second network node and the network node. The core network node is configured to retrieve a second discovery message from an address server (e.g., a DHCP server) operatively coupled to the core network node, which includes an address associated with the network node and an address of the core network node. The core network node is then configured to forward the second discovery message to the network node via the second network node. As a result, the network node is configured to identify the address of the network node and the address of the core network node based on the second discovery message. In some embodiments, the first and second discovery messages can be transmitted between the second network node and the core network node via a tunnel (e.g., a control-plane tunnel). In some embodiments, the network node is configured to send the first discovery message and/or receive the second discovery message without intervention from a network administrator. In some embodiments, the first discovery message can be a dynamic host configuration protocol (DHCP) request, the address server can be a DHCP server, and the address assigned to the network node can be an IP address. In such embodiments, the method for acquiring an IP address for the network node can be similar to the method described in U.S. patent application Ser. No. 13/252,857, filed Oct. 4, 2011, and entitled "Methods and Apparatus for a Scalable Network with Efficient Link Utilization" (now U.S. Pat. No. 9,118,687, which is incorporated herein by reference in its entirety.

In some embodiments, after being authenticated and auto-discovered, the network node can be configured to receive more configuration information (e.g., IP configuration information, information associated with the core network node, etc.) from the core network node. The configuration information can be received by the network node through a control-plane tunnel based on the addresses of the core network node and the network node. Similar to the authentication messages and discovery messages, the configuration information can be received by the network node without intervention from a network administrator.

For example, as shown in FIG. 2, after being authenticated, aggregation network node 231 is configured to send a first discovery message (e.g., a DHCP request) to core network node 221 without intervention from a network administrator. In response to receiving the first discovery message, core network node 221 is configured to retrieve a second discovery message, including an address (e.g., an IP address) assigned to aggregation network node 231 and an address of core network node 221, from a server device (e.g., a DHCP server, not shown in FIG. 2) operatively coupled to core network node 221. Core network node 221 is then configured to forward the second discovery message to aggregation network node 231. As a result, aggregation network node 231 is configured to identify the address of aggregation network node 231 and the address of core network node 221 based on the second discovery message. Subsequently, more configuration information associated with aggregation network node 231 is sent from core network node 221 to aggregation network node 231, such as information associated with establishing a data-plane MPLS tunnel between core network node 221 and access network node 243 through aggregation network node 231, etc. Similar to the first authentication message and the first discovery message, aggregation network node 231 receives the configuration information from core network node 221 without intervention from a network administrator.

For another example, as shown in FIG. 2, after being authenticated, access point 251 is configured to send a first discovery message (e.g., a DHCP request) to access network node 241 without intervention from a network administrator. In response to receiving the first discovery message, access network node 241 is configured to send the first discovery message to core network node 221 via a tunnel (not shown in FIG. 2). Core network node 221 is configured to retrieve a second discovery message, including an address (e.g., an IP address) assigned to access point 251 and an address of core network node 221, from a server device (e.g., a DHCP server, not shown in FIG. 2) operatively coupled to core network node 221. Core network node 221 is then configured to forward the second discovery message to access network node 241 via the tunnel, from which the second discovery message is further forwarded to access point 251. As a result, access point 251 is configured to identify the address of access point 251 and the address of core network node 221 based on the second discovery message. Subsequently, more configuration information associated with access point 251 is sent from core network node 221 to access point 251 via a control-plane tunnel (e.g., shown as the tunnel represented by 20 in FIG. 2) through aggregation network node 231 and access network node 241. The configuration information includes, for example, information associated with establishing a data-plane tunnel (e.g., a data-plane MPLS tunnel) between core network node 221 and access point 251, etc. Similar to the first authentication message and the first discovery message, access point 251 receives the configuration information from core network node 221 without intervention from a network administrator.

After a network node discovers the core network node operatively coupled to the network node, the network node can be configured to discover the topology (or at least a portion of the topology) of the homogeneous enterprise network 200. Specifically, the network node can be configured to run a routing protocol instance, such as an intermediate system to intermediate system (IS-IS) routing protocol instance, on each interface of the network node. Upon discovering a set of one or more network devices that are directly coupled to the network node via one or more interfaces of the network node, the network node can be configured to send a first set of topology message(s) to the set of network device(s). The topology message sent from the network node to a second network device directly coupled to the network node typically includes information associated with an incomplete version of the network topology that has been discovered by the network node so far, such as a list of network devices directly coupled to the network node, routing protocol information associated with the network node, etc. In response to receiving such a topology message, the second network device can update a network topology stored in the second network device based on the received topology message. That is, the second network device can incorporate the information included in the topology message with the network topology that has already been discovered by the second network device before the topology message is received, such that an up-to-date network topology is established at the second network device. Subsequently, the second network device sends a topology message including information associated with the updated network topology to the network node. Thus, the network node can be configured to receive a second set of topology message(s) from the set of network device(s) directly coupled to the network node. Similar to the second network device, the network node can be configured to update the network topology stored in the network node by incorporating information included in the second set of topology message(s). In other words, the network node can be configured to define an updated network topology based on the second set of topology message(s). As a result of such an exchange of topology messages, the topology (or at least a portion of the topology) of the homogeneous enterprise network 200 can be discovered by the network node, and also updated at other network devices of the homogeneous enterprise network 200.

For example, as shown in FIG. 2, after aggregation network node 231 discovers core network node 221, aggregation network node 231 is configured to run an IS-IS routing protocol instance on each interface of aggregation network node 231. As a result, aggregation network node 231 discovers one or more network devices directly coupled to aggregation network node 231 that are in an operational status. In the example of FIG. 2, aggregation network node 231 discovers network devices such as core network nodes 221, 222 and access network nodes 241, 243 that are directly coupled to aggregation network node 231 and in an operational status. Aggregation network node 231 is then configured to send a first set of topology messages to core network node 221, 222 and access network nodes 241, 243, respectively. Each topology message from the first set of topology messages includes an incomplete version of the network topology stored at aggregation network node 231, such as a list of network devices that are directly coupled to aggregation network node 231 (i.e., core network node 221, 222 and access network nodes 241, 243). Consequently, aggregation network node 231 is configured to receive a second set of topology messages from core network node 221, 222 and access network nodes 241, 243, respectively. Each topology message from the second set of topology messages that is received from a network device includes a network topology, or a portion of a network topology, provided by that network device. For instance, the topology message received from core network node 222 includes a portion of the network topology that contains core network node 222, aggregation network node 232, access network nodes 242, 244 and access point 252. Thus, aggregation network node 231 is configured to define an updated network topology of the homogeneous enterprise network 200 based on the second set of topology messages received from core network node 221, 222 and access network nodes 241, 243.

For another example, as shown in FIG. 2, after access point 251 discovers core network node 221, access point 251 is configured to run a routing protocol instance (e.g., an IS-IS routing protocol instance) on each interface of access point 251. As a result, access point 251 discovers access network node 241 that is directly coupled to access point 251, as shown in FIG. 2. Access point 251 is then configured to send a first topology message to access network node 241, which includes an incomplete version of the network topology stored at access point 251, such as a list of network device(s) that are directly coupled to access point 251 (i.e., access network node 241). Consequently, access point 251 is configured to receive a second topology message from access network node 241, which includes information associated with a network topology stored at access network node 241, such as a portion of the network topology that contains core network node 221, aggregation network node 231 and access network nodes 241, 243. Thus, access point 251 is configured to define an updated network topology of the homogeneous enterprise network 200 based on the second topology message received from access network node 241.

Note that the above process for discovering the topology from neighboring network devices can be implemented for only network devices that also have been authenticated. In such embodiments, each network device can receive a shared secret (e.g., authentication password) during the authentication process. This shared secret can be used during signaling between network devices to determine whether the neighboring network devices have been authenticated. If so, then the topology information can be exchanged from only authenticated network devices.

Once a network topology is established at a network node, the network node can be configured to define one or more data-plane paths that connect the network node to one or more core network nodes. Specifically, the network node can be configured to send a first set of routing message(s) to a set of network device(s) that are directly coupled to the network node. The first set of routing message(s) can include forwarding policy information that is used to establish one or more data-plane tunnels, and/or to forward data traffic, between the network node and one or more core network nodes operatively coupled to the network node. Subsequently, the network node can receive a second set of routing message(s) from the set of network device(s). Similar to the first set of routing message(s), each routing message from the second set of routing message(s) includes forwarding policy information associated with establishing the data-plane tunnels that is provided by a network device included in the tunnels. As a result of such an exchange of routing messages, one or more routed paths can be established between the network node and the core network nodes. Data-plane tunnels can be subsequently established over these routed paths using protocols such as MPLS, LDP, CAPWAP, Ethernet-in-GRE, etc. In other words, data-plane packets can be transmitted between the network node and the core network nodes (e.g., via the data-plane tunnels) based on data-plane tunnels that are established after the exchange of the first and second sets of routing messages. Furthermore, forwarding policies are configured appropriately at each intervening network device included in the data-plane tunnels, such that data packets tunneled between the network node and the core network nodes can be forwarded appropriately at the intervening network device. As an example, in some embodiments, once an IS-IS topology is established within the homogeneous enterprise network 200, the label distribution protocol (LDP) can be used to define a label switched path (LSP) between a network node and a core network node operatively coupled to the network node, such that data packets transmitted between the network node and the core network node can be tunneled through the LSP based on the MPLS tunneling protocol.

For example, as shown in FIG. 2, after a network topology is established at aggregation network node 231, aggregation network node 231 is configured to send a first set of routing messages to core network nodes 221, 222 and access network nodes 241, 243. Each routing message from the first set of routing messages includes forwarding policy information associated with establishing data-plane tunnels (e.g., data-plane MPLS tunnels) between core network nodes 221, 222 and access network nodes 241, 243, through aggregation network node 231. Subsequently, aggregation network node 231 is configured to receive a second set of routing messages from core network nodes 221, 222 and access network nodes 241, 243. Similar to the first set of routing messages, each routing message from the second set of routing messages that is received from a network device includes information provided by that network device that is associated with establishing the tunnels (e.g., MPLS tunnels, Ethernet-over-layer-3 tunnels). For instance, the routing message received from access network node 243 includes information associated with establishing the tunnel between access network node 243 and core network nodes 221, 222 through aggregation network node 231. As a result of such an exchange of routing messages, the tunnels for transmitting data packets can be established between access network nodes 241, 243 and core network nodes 221, 222, through aggregation network node 231.

For another example, as shown in FIG. 2, after a network topology is established at access point 251, access point 251 is configured to send a first routing message to access network node 241, which is then further forwarded by access network node 241 to aggregation network node 231 and core network nodes 221, 222. Alternatively, access point 251 can be configured to send a first set of routing messages to access network node 241, aggregation network node 231 and core network nodes 221, 222 (e.g., through access network node 241 and/or aggregation network node 231). Each routing message sent from access point 251 includes forwarding policy information associated with establishing data-plane tunnels (e.g., data-plane MPLS tunnels, data-plane Ethernet-over-layer-3 tunnels) between access point 251 and core network nodes 221, 222, respectively, through access network node 241 and aggregation network node 231. Subsequently, access point 251 is configured to receive a second routing message from access network node 241. Alternatively, access point 251 can be configured to receive a second set of routing messages from access network node 241, aggregation network node 231 and core network nodes 221, 222. Similar to the routing message(s) sent from access point 251, each routing message received at access point 251 from a network device includes information provided by that network device that is associated with establishing the tunnels (e.g., the MPLS tunnels, the Ethernet-over-layer-3 tunnels). For instance, the routing message received from core network node 221 includes information associated with establishing the tunnel (e.g., the MPLS tunnel, the Ethernet-over-layer-3 tunnels) between access point 251 and core network node 221 through access network node 241 and aggregation network node 231. As a result of such an exchange of routing messages, tunnels for transmitting data packets can be established between access point 251 and core network nodes 221, 222, through access network node 241 and aggregation network node 231.

After one or more data-plane tunnels are established to connect a network node with one or more core network nodes, the network node finishes self-configuration and is ready to provide services to users of the homogeneous enterprise network 200, such as sending, receiving, and/or forwarding data packets for the users via the data-plane tunnels. Overall, as described herein, the network node is configured to automatically configure itself based on the configuration information received from one or more core network nodes, the network topology defined based on the second set of topology message(s), and/or the received second set of routing message(s), etc.

In some embodiments, an enterprise network can include an overlay portion and a homogeneous portion. Similar to the network devices in the overlay enterprise network 100 in FIG. 1, network devices in the overlay portion of the enterprise network typically are individually and manually configured by a network administrator, as described with respect to FIG. 1. In contrast, similar to the network devices in the homogeneous enterprise network 200 in FIG. 2, network devices in the homogeneous portion of the enterprise network are typically self-organized and automatically configured without intervention from a network administrator, as described with respect to FIG. 2. In such an enterprise network, even though the network devices in the overlay portion and the homogeneous portion are organized and configured in different fashions, they can still communicate with each other and transmit data packets between the two portions of the enterprise network.

Figure 3:
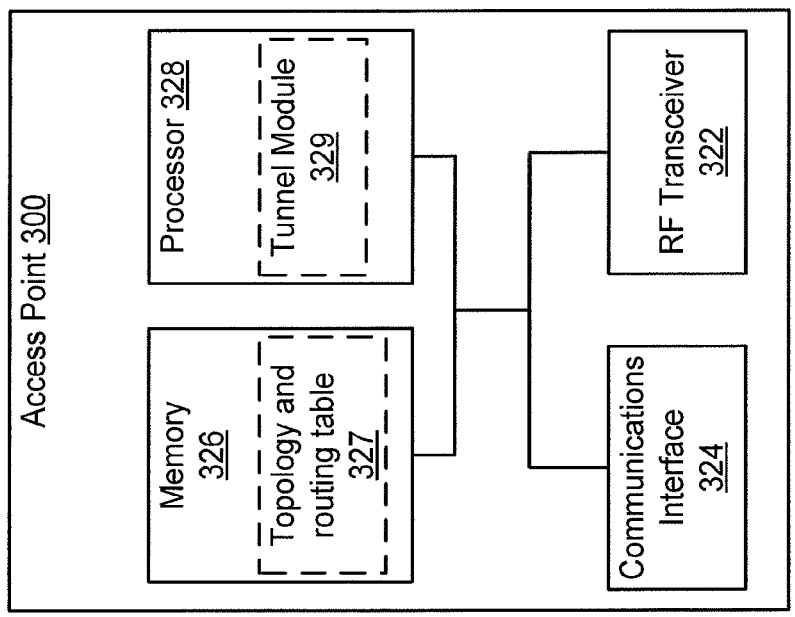
FIG. 3 is a system block diagram of an access point, according to an embodiment.

FIG. 3 is a system block diagram of an access point 300, according to an embodiment. Similar to access point 251 and access point 252 in the homogeneous enterprise network 200 shown in FIG. 2, access point 300 can be any device that connects one or more wireless host devices to a homogeneous enterprise network (e.g., via an access network node) using for example, Wi-Fi, Bluetooth or other wireless communication standards. For example, access point 300 can be a wireless access point (WAP). As shown in FIG. 3, access point 300 includes RF transceiver 322, communications interface 324, memory 326, and processor 328, which contains tunnel module 329. Each component of access point 300 is operatively coupled to each of the remaining components of access point 300. Furthermore, each operation of RF transceiver 322 (e.g., transmit/receive data), communications interface 324 (e.g., transmit/receive data), tunnel module 329 (e.g., encapsulate/decapsulate packets), as well as each manipulation on memory 326 (e.g., update a policy table), are controlled by processor 328.

In some embodiments, access point 300 can communicate with a wireless host device (e.g., a Wi-Fi enabled laptop, a mobile phone) using any suitable wireless communication standard such as, for example, Wi-Fi, Bluetooth, and/or the like. Specifically, access point 300 can be configured to receive data and/or send data through RF transceiver 322, when communicating with a wireless host device. Furthermore, in some embodiments, an access point of an enterprise network uses one wireless communication standard to wirelessly communicate with a wireless host device operatively coupled to the access point; while another access point of the enterprise network uses a different wireless communication standard to wirelessly communicate with a wireless host device operatively coupled to the other access point. For example, as shown in FIG. 2, access point 251 can receive data packets through its RF transceiver from wireless host device 291 (e.g., a Wi-Fi enabled laptop) based on the Wi-Fi standard; while access point 252 can send data packets from its RF transceiver to another wireless host device (e.g., a Bluetooth-enabled mobile phone) (not shown in FIG. 2) based on the Bluetooth standard.

In some embodiments, access point 300 can be operatively coupled to an access network node by implementing a wired connection between communications interface 324 and the counterpart (e.g., a communications interface) of the access network node. The wired connection can be, for example, twisted-pair electrical signaling via electrical cables, fiber-optic signaling via fiber-optic cables, and/or the like. As such, access point 300 can be configured to receive data and/or send data through communications interface 324, which is connected with the communications interface of an access network node, when access point 300 is communicating with the access network node. Furthermore, in some embodiments, an access point of an enterprise network implements a wired connection with an access network node operatively coupled to the access point; while another access point of the enterprise network implements a different wired connection with an access network node operatively coupled to the other access point. For example, as shown in FIG. 2, access point 251 can implement one wired connection such as twisted-pair electrical signaling to connect with access network node 241; while access point 252 can implement a different wired connection such as fiber-optic signaling to connect with access network node 244.

In some embodiments, as described with respect to FIG. 2, access point 300 can be configured to prepare a packet (e.g., a data packet, a control packet) received from a wireless host device operatively coupled to access point 300, and send the packet to another network device such as a core network node via a tunnel (e.g., an Ethernet-over-layer-3 tunnel, a MPLS tunnel). Access point 300 can also be configured to decapsulate a packet received via a tunnel from another network device such as a core network node, before forwarding the decapsulated packet to a wireless host device operatively coupled to access point 300. Specifically, upon receiving a packet from a wireless host device operatively coupled to access point 300, tunnel module 329 is configured to encapsulate the packet (e.g., add a header portion, a footer portion, and/or modify any other identifiers included within the packet) according to a predetermined tunneling protocol (e.g., CAPWAP, Ethernet-in-GRE, MPLS). The encapsulated packet is then sent through communications interface 324 to an access network node connected to access point 300, from which the encapsulated packet is forwarded along the tunnel to a network device at the end of the tunnel. On the other hand, upon receiving a packet from an access network node connected to access point 300 that is sent through a tunnel from a network device, tunnel module 329 is configured to decapsulate the packet (e.g., remove a header portion, a footer portion, and/or modify any other identifiers included within the packet) according to a predetermined tunneling protocol (e.g., CAPWAP, Ethernet-in-GRE, MPLS). The decapsulated packet is then sent by RF transceiver 322 to a wireless host device operatively coupled to access point 300.

In some embodiments, as described with respect to FIG. 2, when the network device (e.g., a core network node) at the end of the tunnel and all the intervening wired network nodes (e.g., access network nodes, aggregation network nodes) are within a homogeneous enterprise network or a homogeneous portion of an enterprise network, tunnel module 329 can be configured to encapsulate or decapsulate a packet according to a tunneling protocol such as MPLS or an Ethernet-over-layer-3 tunneling protocol. In such embodiments, access point 300 can be configured to send a packet to and/or receive a packet from a core network node via a tunnel such as a MPLS tunnel or an Ethernet-over-layer-3 tunnel through intervening wired network nodes. In some other embodiments, as described below with respect to FIG. 1, when one or more of the network devices at the end of the tunnel and intervening wired network nodes are within an overlay enterprise network or an overlay enterprise network portion of an enterprise network, tunnel module 329 may be configured to encapsulate or decapsulate a packet, for example, according to an Ethernet-over-layer-3 tunneling protocol (e.g., CAPWAP, Ethernet-in-GRE). In such embodiments, access point 300 may be configured to send a packet to and/or receive a packet from a core network node via an Ethernet-over-layer-3 tunnel through the intervening wired network nodes.

In some embodiments, memory 326 can be, for example, a random-access memory (RAM) (e.g., a dynamic RAM, a static RAM), a flash memory, a removable memory, and/or so forth. In some embodiments, data related to operations of access point 300 can be stored in memory 326. For example, topology and routing table 327 can be maintained within memory 326. Topology and routing table 327 can maintain network topology information obtained neighboring devices as described below. Topology and routing table 327 can be accessed by the processor 328 of access point 300 to discover paths to other nodes such as other access points, access network nodes and/or core network nodes. For another example, an up-link policy table (not shown in FIG. 3) can be stored in memory 326, such that one or more up-link policies associated with a user can be downloaded to and enforced at access point 300 when the user is operatively coupled to access point 300 using a wireless host device. For yet another example, information associated with tunneling packets to a core network node can be stored in memory 326, such that access point 300 can establish a tunnel such as a MPLS tunnel with the core network node.

Similar to the access points 251, 252 in the homogeneous enterprise network 200 described above with respect to FIG. 2, access point 300 can be self-organized and automatically configured in a homogeneous enterprise network or a homogeneous portion of an enterprise network, without intervention from a network administrator. Specifically, after booting up in the homogeneous enterprise network, access point 300 can be configured to send a first authentication message via a port of communications interface 324 to a network device (e.g., an access network node) that is directly coupled to access point 300 through that port of communications interface 324. The first authentication message requests access point 300 to be authenticated and allowed to access resources located on the homogeneous enterprise network. Consequently, access point 300 can receive a second authentication message via the same port of communications interface 324 from the network device. Access point 300 can be configured to send the first authentication message and receive the second authentication message without intervention from a network administrator. As a result, access point 300 can be authenticated based on the second authentication message.

After being authenticated, access point 300 can be configured to send a first discovery message (e.g., a DHCP request) to a network device directly coupled to access point 300 via a port of communications interface 324. The first discovery message requests an address (e.g., IP address) assigned to access point 300. Consequently, access point 300 can receive, from the network device, a second discovery message including an address assigned to access point 300 and an address of a core network node operatively coupled to access network node 300, via the port of communications interface 324. Access point 300 can be configured to send the first discovery message and receive the second discovery message without intervention from a network administrator. As a result, access point 300 can be configured to identify the address of access point 300 and the address of the core network node based on the second discovery message, and store these addresses in memory 326. Furthermore, access point 300 can receive more configuration information from the core network node via a port of communications interface 324, without intervention from a network administrator. The configuration information can be received by access point 300 through a control-plane tunnel that connects access point 300 and the core network node, based on the addresses of access point 300 and the core network node.

Next, access point 300 can be configured to run a routing protocol instance on communications interface 324 to discover all the neighboring network devices that are directly coupled to access point 300 through a port of communications interface 324. Then, access point 300 can be configured to send a first set of topology message(s) to the set of neighboring network devices, via the port(s) of communications interface 324. Each topology message sent from access point 300 to a neighboring network device includes an incomplete version of the network topology that is stored in memory 326. Consequently, access point 300 can receive a second set of topology message(s) from the set of neighboring network device(s) via the port(s) of communications interface 324. Each topology message received at access point 300 from a neighboring network device includes an updated version of the network topology provided by the neighboring network device. Thus, access point 300 can be configured to define an up-to-date version of the network topology based on the second set of topology message(s), and store this information in memory 326.

Furthermore, access point 300 can be configured to send a first set of routing message(s) to the set of neighboring network device(s) via one or more ports of communications interface 324. Each routing message sent from access point 300 includes forwarding policy information stored in memory 326 that is used to establish one or more data-plane tunnels (e.g., MPLS tunnels) connecting access point 300 with one or more core network nodes operatively coupled to access point 300. Consequently, access point 300 can receive a second set of routing message(s) from the set of neighboring network device(s) via one or more ports of communications interface 324. As a result, one or more data-plane tunnels between access point 300 and one or more core network nodes can be established based on the first and second sets of routing messages. Thus, data packets can be transmitted between access point 300 and the core network nodes via the data-plane tunnels. Overall, access point 300 is automatically configured based on the configuration information received from the core network nodes, the network topology defined based on the second set of topology message(s), and/or the received second set of routing message(s), etc.

Figure 4:
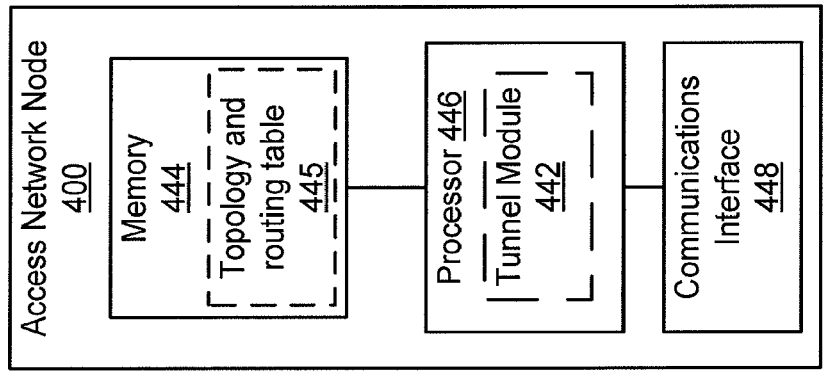
FIG. 4 is a system block diagram of an access network node, according to an embodiment.

FIG. 4 is a system block diagram of an access network node 400, according to an embodiment. Similar to access network node 241-244 in the homogeneous enterprise network 200 shown in FIG. 2, access network node 400 can be any device that connects one or more wired communication devices to a homogeneous enterprise network, such as a hub, an Ethernet switch, etc. More specifically, access network node 400 is configured to ensure packets are transmitted between one or more aggregation network nodes, wired host devices, and/or access points that are operatively coupled to access network node 400. As shown in FIG. 4, access network node 400 includes communications interface 448, memory 444, and processor 446, which contains tunnel module 442. Each component of access network node 400 is operatively coupled to each of the remaining components of access network node 400. Furthermore, each operation of communications interface 448 (e.g., transmit/receive data), tunnel module 442 (e.g., encapsulate/decapsulate packets), as well as each manipulation on memory 444 (e.g., update a policy table), are controlled by processor 446.

In some embodiments, communications interface 448 of access network node 400 includes at least two ports (not shown in FIG. 4) that can be used to implement one or more wired connections between access network node 400 and one or more access points, wired host devices, and/or aggregation network nodes. The wired connection can be, for example, twisted-pair electrical signaling via electrical cables, fiber-optic signaling via fiber-optic cables, and/or the like. As such, access network node 400 can be configured to receive data and/or send data through one or more ports of communications interface 448, which are connected to the communications interfaces of one or more access points, wired host devices, and/or aggregation network nodes. Furthermore, in some embodiments, access network node 400 can implement a wired connection with one of an access point, a wired host device, or an aggregation network node that is operatively coupled to access network node 400 through one port of communications interface 448, while implementing a different wired connection with another access point, wired host device, or aggregation network node that is operatively coupled to access network node 400 through another port of communications interface 448. For example, as shown in FIG. 2, access network node 241 can implement one wired connection such as twisted-pair electrical signaling to connect with access point 251, while implementing a different wired connection such as fiber-optic signaling to connect with aggregation network node 231.

In some embodiments, as described with respect to FIG. 2 and FIG. 3, access network node 400 can be one of the intervening wired network nodes between an access point and a core network node, through which a tunnel (e.g., an Ethernet-over-layer-3 tunnel, a MPLS tunnel) is established between the access point and the core network node. In such embodiments, access network node 400 can be configured to forward a tunneled packet (e.g., a packet encapsulated according to an Ethernet-over-layer-3 tunneling protocol, a packet encapsulated according to the MPLS protocol). For example, as shown in FIG. 2, access network node 241 can forward a tunneled packet encapsulated according to the MPLS protocol or an Ethernet-over-layer-3 tunneling protocol, which is received from access point 251, to aggregation network node 231 along a MPLS tunnel or an Ethernet-over-layer-3 tunnel (e.g., shown as the tunnel represented by 20 in FIG. 2) between access point 251 and core network node 221.

In some embodiments, as described with respect to FIG. 2, access network node 400 can be configured to prepare a packet (e.g., a data packet, a control packet) received from a wired host device operatively coupled to access network node 400, and send the packet to another network device such as a core network node via a tunnel (e.g., a tunnel according to an Ethernet-over-layer-3 protocol (e.g., Ethernet-in-GRE, CAPWAP, etc.) or the MPLS protocol). Access network node 400 can also be configured to decapsulate a packet received via a tunnel from another network device such as a core network node, before forwarding the decapsulated packet to a wired host device operatively coupled to access network node 400. Specifically, upon receiving a packet from a wired host device operatively coupled to access network node 400, tunnel module 442 is configured to encapsulate the packet (e.g., add a header portion, a footer portion, and/or modify any other identifiers included within the packet) according to the protocol of the tunnel. The encapsulated packet is then sent through a port of communications interface 448 to an aggregation network node connected to access network node 400, from which the encapsulated packet is forwarded along the tunnel to a core network node. On the other hand, upon receiving a packet from an aggregation network node connected to access network node 400 that is sent through a tunnel from a core network node, tunnel module 442 is configured to decapsulate the packet (e.g., remove a header portion, a footer portion, and/or modify any other identifiers included within the packet) according to the protocol of the tunnel. The decapsulated packet is then sent through a port of communications interface 448 to a wired host device operatively coupled to access network node 400.

In some embodiments, memory 444 can be, for example, a random-access memory (RAM) (e.g., a dynamic RAM, a static RAM), a flash memory, a removable memory, and/or so forth. In some embodiments, data related to operations of access network node 400 can be stored in memory 444. For example, topology and routing table 445 can be maintained within memory 444. Topology and routing table 445 can maintain network topology information obtained neighboring devices as described below. Topology and routing table 445 can be accessed by the processor 446 of access network node 400 to discover paths to other nodes such as other access network nodes, access points and/or core network nodes. For another example, an up-link policy table (not shown in FIG. 4) can be stored in memory 444, such that one or more up-link policies associated with a user can be downloaded to and enforced at access network node 400 when the user is operatively coupled to access network node 400 using a wired host device. For yet another example, information associated with tunneling packets to a core network node can be stored in memory 444, such that establishing a MPLS tunnel or an Ethernet-over-layer-3 tunnel with the core network node can be initialized by access network node 400.

Similar to the access network nodes 241-244 in the homogeneous enterprise network 200 described above with respect to FIG. 2, access network node 400 can be self-organized and automatically configured in a homogeneous enterprise network or a homogeneous portion of an enterprise network, without intervention from a network administrator. Specifically, after booting up in the homogeneous enterprise network, access network node 400 can be configured to send a first authentication message via a port of communications interface 448 to a network device (e.g., an aggregation network node) that is directly coupled to access network node 400 through that port of communications interface 448. The first authentication message requests access network node 400 to be authenticated and allowed to access resources located on the homogeneous enterprise network. Consequently, access network node 400 can receive a second authentication message via the same port of communications interface 448 from the network device. Access network node 400 can be configured to send the first authentication message and receive the second authentication message without intervention from a network administrator. As a result, access network node 400 can be authenticated based on the second authentication message.

After being authenticated, access network node 400 can be configured to send a first discovery message (e.g., a DHCP request) to a network device directly coupled to access network node 400 via a port of communications interface 448. The first discovery message requests an address (e.g., IP address) assigned to access network node 400. Consequently, access network node 400 can receive, from the network device, a second discovery message including an address assigned to access network node 400 and an address of a core network node operatively coupled to access network node 400, via the port of communications interface 448. Access network node 400 can be configured to send the first discovery message and receive the second discovery message without intervention from a network administrator. As a result, access network node 400 can be configured to identify the address of access network node 400 and the address of the core network node based on the second discovery message, and store these addresses in memory 444. Furthermore, access network node 400 can receive more configuration information from the core network node via a port of communications interface 448, without intervention from a network administrator. The configuration information can be received by access network node 400 through a control-plane tunnel that connects access network node 400 and the core network node, based on the addresses of access network node 400 and the core network node.

Next, access network node 400 can be configured to run a routing protocol instance on communications interface 448 to discover a set of the neighboring network device(s) directly coupled to access network node 400 through a port of communications interface 448. Then, access network node 400 can be configured to send a first set of topology message(s) to the set of neighboring network device(s), via the port(s) of communications interface 448. Each topology message sent from access network node 400 to a neighboring network device includes an incomplete version of the network topology that is stored in memory 444. Consequently, access network node 400 can receive a second set of topology message(s) from the set of neighboring network device(s) via the port(s) of communications interface 448.

Each topology message received at access network node 400 from a neighboring network device includes an updated version of the network topology provided by that neighboring network device. Thus, access network node 400 can be configured to define an up-to-date version of the network topology based on the second set of topology message(s), and store this information in memory 444.

Furthermore, access network node 400 can be configured to send a first set of routing message(s) to the set of neighboring network device(s) via one or more ports of communications interface 448. Each routing message sent from access network node 400 includes forwarding policy information stored in memory 444 that is used to establish one or more data-plane tunnels (e.g., MPLS tunnels, Ethernet-over-layer-3 tunnels) connecting access network node 400 with one or more core network nodes operatively coupled to access network node 400. Consequently, access network node 400 can receive a second set of routing message(s) from the set of neighboring network device(s) via one or more ports of communications interface 448. As a result, one or more data-plane tunnels between access network node 400 and one or more core network node(s) can be established based on the first and second sets of routing messages. Thus, data packets can be transmitted between access network node 400 and the core network node(s) via the data-plane tunnels. Overall, access network node 400 is automatically configured based on the configuration information received from the core network node(s), the network topology defined based on the second set of topology message(s), and/or the received second set of routing message(s), etc.

FIG. 5 is a system block diagram of a core network node 500, according to an embodiment. Similar to core network node 221 and core network node 222 in the homogeneous enterprise network 200 shown in FIG. 2, core network node 500 can be any switching device positioned in the physical core, or backbone, of an enterprise network, which is configured to operatively couple the remaining devices (e.g., aggregation network nodes, access network nodes, access points) of the enterprise network to one or more other networks that provide access to data resources and/or information services. More specifically, core network node 500 is configured, for example, to forward data between one or more aggregation network nodes and one or more other networks that are operatively coupled to core network node 500, based on IP routing services. Furthermore, core network node 500 is configured, for example, to manage user sessions for both wired and wireless clients, and be involved in the self-organization and automatic configuration of network devices in the enterprise network, as described in detail herein.

As shown in FIG. 5, core network node 500 includes communications interface 530; memory 510; and processor 520, which contains tunnel module 522 and control module 524. Each operation of communications interface 530 (e.g., transmit/receive data), tunnel module 522 (e.g., encapsulate/decapsulate packets), and control module 524 (e.g., manage a user session), as well as each manipulation on any portion of memory 510, are controlled by processor 520.

In some embodiments, communications interface 530 of core network node 500 includes at least two ports (not shown in FIG. 5) that can be used to implement one or more wired connections between core network node 500 and one or more aggregation network nodes, one or more access network nodes, other core network nodes, and/or devices of other networks. The wired connections can be, for example, twisted-pair electrical signaling via electrical cables, fiber-optic signaling via fiber-optic cables, and/or the like. As such, core network node 500 can be configured to receive data and/or send data through one or more ports of communications interface 530, which are connected with the communications interfaces of one or more aggregation network nodes, one or more access network nodes, other core network nodes, and/or devices of other networks. Furthermore, in some embodiments, core network node 500 can implement a wired connection with one of an aggregation network node, an access network node, another core network node, or a device of another network that is operatively coupled to core network node 500 through one port of communications interface 530, while implementing a different wired connection with another aggregation network node, access network node, core network node, or device of another network that is operatively coupled to core network node 500 through another port of communications interface 530. For example, as shown in FIG. 2, core network node 221 can implement one wired connection such as twisted-pair electrical signaling to connect with aggregation network node 231, aggregation 232 and core network node 222, while implementing a different wired connection such as fiber-optic signaling to connect with a device of network 201.

In some embodiments, as described with respect to FIG. 2, core network node 500 can be configured to prepare a packet (e.g., a data packet, a control packet) to be sent to an access device (e.g., an access point, an access network node) via a tunnel (e.g., an Ethernet-over-layer-3 tunnel, a MPLS tunnel). Core network node 500 can also be configured to receive and decapsulate an encapsulated packet from an access device via a tunnel. Similar to core network nodes in the overlay enterprise network 100 shown in FIG. 1, core network node 500 can be configured to forward packets to and/or receive packets from other network devices that are operatively coupled to core network node 500, including other core network nodes and/or devices in other networks, without using any tunneling technology. Particularly, control module 524 of core network node 500 is configured to manage both wired and wireless user sessions for one or more users and/or for one or more host devices.

More specifically, upon receiving a packet associated with a user session at a port of communications interface 530 via a tunnel (e.g., an Ethernet-over-layer-3 tunnel or a MPLS tunnel), tunnel module 522 is configured to decapsulate the packet (e.g., remove a header portion, a footer portion, and/or modify any other identifiers included within the packet) according to the protocol for that tunnel. Alternatively, core network node 500 receives a packet associated with a user session at a port of communications interface 530 from another network device operatively coupled to core network node 500, such as another core network node or a device in another network.

To forward the received packet, control module 524 is configured to check the destination IP address or the destination MAC address included in the packet. If the packet is not destined to a user in a pod that is directly connected to core network node 500 (e.g., destined to a network device in a pod that is not connected to core network node 500, destined to a user in another network), control module 524 is configured to forward the packet, from a port of communications interface 530, to a network device that is operatively coupled to core network node 500. For example, control module 524 can be configured to forward the packet to another core network node operatively coupled to core network node 500 via a tunnel between the two core network nodes. For another example, control module 524 can be configured to forward the packet to a network device in another network operatively coupled to core network node 500 without using any tunneling technology. If the packet is destined to a user in a pod that is directly connected to core network node 500, tunnel module 522 is configured to encapsulate the packet (e.g., add a header portion, a footer portion, and/or modify any other identifiers included within the packet) according to the protocol for the tunnel. Meanwhile, control module 524 is configured to establish a tunnel connecting core network node 500 to the access device (e.g., an access network node, an access point) that is operatively coupled to the host device (if such a tunnel is not established yet). Finally, control module 524 is configured to send the encapsulated packet, from a port of communications interface 530, to the access device through the tunnel.

In some embodiments, memory 510 can be, for example, a random-access memory (RAM) (e.g., a dynamic RAM, a static RAM), a flash memory, a removable memory, and/or so forth. In some embodiments, data related to operations of core network node 500 can be stored in memory 510. For example, topology and routing table 512 can be maintained within memory 510. Topology and routing table 512 can maintain network topology information obtained neighboring devices as described below. Topology and routing table 512 can be access by the processor 520 of core network node 500 to discover paths to other nodes such as other core network nodes, access points and/or access network nodes. For example, combinations of user IDs and passwords of potential users can be stored in memory 510, such that the identification of a user can be verified by core network node 500 upon a user ID and a password entered by the user being provided to core network node 500. For another example, information associated with tunneling packets to one or more access devices can be stored in memory 510, such that establishing a MPLS tunnel or an Ethernet-over-layer-3 tunnel with one of the access devices can be initialized by core network node 500.

Similar to core network nodes 221, 222 in the homogeneous enterprise network 200 shown in FIG. 2, core network node 500 in a homogeneous enterprise network or a homogeneous portion of an enterprise network can be involved in the self-organization and automatic configuration of a network node (e.g., an access point, an access network node, an aggregation network node) in the homogeneous enterprise network. In some embodiments, core network node 500 can be involved in authenticating a network node. Specifically, core network node 500 can function as an authentication server for the network node. Alternatively, core network node 500 can be operatively coupled to an authentication server. In such embodiments, as described with respect to FIG. 2, a first authentication message sent from the network node can be forwarded to and received by core network node 500 via a port of communications interface 530. Core network node 500 can authenticate the network node by sending a second authentication message to the network node via a port of communications interface 530. Alternatively, core network node 500 can forward the first authentication message to the authentication server operatively coupled to core network node 500 via a port of communications interface 530. After receiving a second authentication message from the authentication server, core network node 500 can be configured to forward the second authentication message to the network node via a port of communications interface 530. In some embodiments, core network node 500 can be configured to receive, send or forward the first and/or the second authentication message without intervention from a network administrator.

In some embodiments, core network node 500 can be involved in the auto-discovery of a network node. Specifically, core network node 500 can be operatively coupled via a port of communications interface 530 to an address server (e.g., a DHCP server) that is used to assign an address (e.g., IP address) to a network node. As described with respect to FIG. 2, core network node 500 can be configured to receive a first discovery message via a port of communications interface 530 from the network node, which requests an address assigned to the network node. Subsequently, core network node 500 can be configured to forward the first discovery message, via a port of communications interface 530, to the address server operatively coupled to core network node 500. As a result, a second discovery message including an address for the network node and an address of core network node 500 is sent from the address server and received at a port of communications interface 530 of core network node 500, which then forwards the second discovery message to the network node. Furthermore, based on the address for the network node and the address of core network node 500, core network node 500 can be configured to send more configuration information associated with the network node to the network node. In some embodiments, core network node 500 can be configured to receive or forward the first and/or the second discovery message, and send the configuration information without intervention from a network administrator. In some embodiments, the configuration information can be sent from core network node 500 to the network node (e.g., an access network node, an access point) via a control-plane tunnel.

In some embodiments, core network node 500 can be involved in establishing a data-plane tunnel (e.g., MPLS tunnel, Ethernet-over-layer-3 tunnel) that connects core network node 500 with a network node (e.g., an access network node, an access point). As described with respect to FIG. 2, core network node 500 can be configured to receive, via a port of communications interface 530, a first routing message originated by a network node operatively coupled to core network node 500. The first routing message received by core network node 500 can include forwarding policy information provided by the network node that is associated with establishing a data-plane tunnel between the network node and core network node 500. In response, core network node 500 can be configured to generate and send, via a port of communications interface 530, a second routing message to the network node, which includes information provided by core network node 500 that is associated with establishing the data-plane tunnel. As a result of such an exchange of routing messages, the data-plane tunnel between core network node 500 and the network node can be established based on the first and second routing messages.

Figure 6:
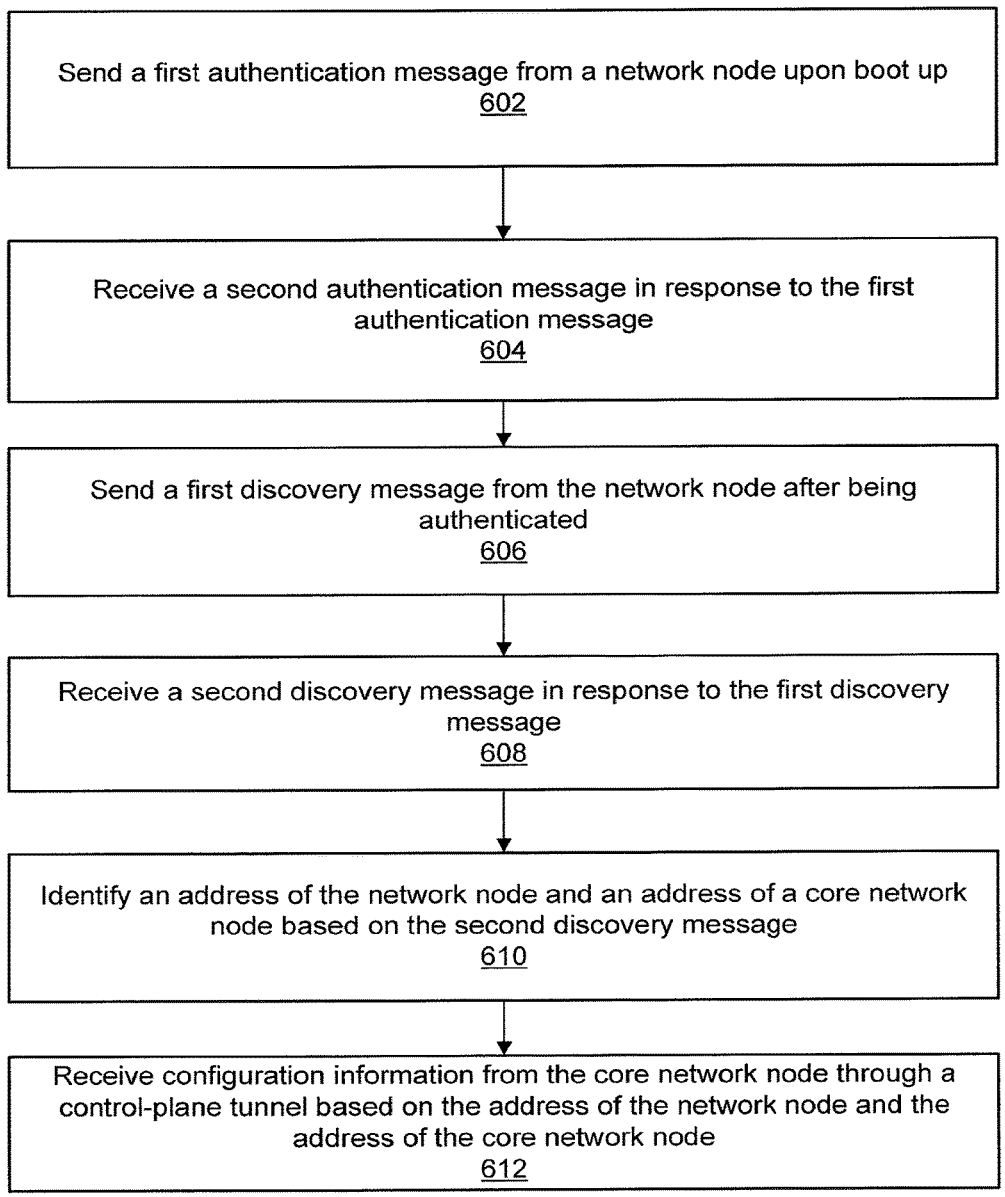
FIG. 6 is a flow chart of a method for authenticating, discovering and configuring a network node, according to an embodiment.

FIG. 6 is a flow chart of a method for authenticating, discovering and configuring a network node, according to an embodiment. At 602, a first authentication message can be sent from a network node upon boot up. Specifically, the network node can be an access point, an access network node, or an aggregation network node of a homogeneous enterprise network (e.g., the homogeneous enterprise network 200 in FIG. 2) or a homogeneous portion of an enterprise network. The first authentication message can be a message that requests the network node to be authenticated, for example, by an authentication server of the homogeneous enterprise network. In some embodiments, the first authentication message includes credential information associated with the network node, such as a digital certificate, an MAC address, etc. As described in detail with respect to FIG. 2, after booting up, the network node can be configured to send the first authentication message to a second network device (e.g., an access network node, an aggregation network node, a core network node) directly coupled to the network node, without intervention from a network administrator. The second network device can then forward the first authentication message to the authentication server, which can determine to authenticate the network node or not based on the information included in the first authentication message.

In the example of FIG. 2, after booting up, access network node 243 is configured to send a first authentication message to aggregation network node 231 without intervention from a network administrator. The first authentication message sent from access network node 243 includes a digital certificate associated with access network node 243. In response to receiving the first authentication message, aggregation network node 231 forwards the first authentication message to core network node 221, which then forwards the first authentication message to an authentication server (not shown in FIG. 2) operatively coupled to core network node 221. The authentication server determines to authenticate access network node 243 or not based on the first authentication message.

At 604, a second authentication message can be received by the network node in response to the first authentication message. For example, after the authentication server authenticates the network node, the authentication server can generate and then send a second authentication message to the network node via one or more intervening wired network nodes. After receiving the second authentication message, the network node can be authenticated based on the second authentication message, and thus allowed to access resources located on the homogeneous enterprise network.

In the example of FIG. 2, in response to receiving the first authentication message, the authentication server operatively coupled to core network node 221 generates and sends a second authentication message to access network node 243 via core network node 221 and aggregation network node 231. Thus, access network node 243 is authenticated based on the second authentication message, and allowed to access resources located on the homogeneous enterprise network 200.

At 606, a first discovery message can be sent from the network node after the network node being authenticated. For example, the first discovery message can be a message that requests an address (e.g., IP address) to be assigned to the network node, such as a DHCP request. As described in detail with respect to FIG. 2, after being authenticated, the network node can be configured to send such a first discovery message to a second network device directly coupled to the network node. The network node can send the first discovery message without intervention from a network administrator. In response to receiving the first discovery message from the network node, the second network device can forward the first discovery message to a core network node operatively coupled to the network node and the second network device. The core network node can then forward the first discovery message to an address server (e.g., DHCP server) operatively coupled to the core network node, which can assign an address to the network node.

In the example of FIG. 2, after being authenticated, access network node 243 is configured to send a DHCP request to aggregation network node 231 without intervention from a network administrator. The DHCP request sent from access network node 243 requests an IP address to be assigned to access network node 243. In response to receiving the DHCP request, aggregation network node 231 forwards the DHCP request to core network node 221, which then forwards the DHCP request to a DHCP server operatively coupled to core network node 221.

At 608, a second discovery message can be received by the network node in response to the first discovery message. For example, after assigning an address to the network node, the address server can generate a second discovery message that includes the address for the network node and an address of the core network node operatively coupled to the network node. The second discovery message is then sent to the network node via intervening wired network nodes including the core network node and the second network device that is directly coupled to the network node.

In the example of FIG. 2, in response to receiving the DHCP request from access network node 243, the DHCP server sends a DHCP response message to access network node 243 via core network node 221 and aggregation network node 231. The DHCP response message includes an IP address assigned to access network node 243 and the IP address of core network node 221. Thus, access network node 243 is configured to receive the DHCP response message in response to the DHCP request sent from access network node 243.

At 610, an address of the network node and an address of a core network node can be identified by the network node based on the second discovery message. Specifically, the address assigned to the network node by an address server and the address of the core network node operatively coupled to the network node are included in the second discovery message received by the network node. Thus, based on the second discovery message, the network node can be configured to identify the address of the network node and the address of the core network node.

In the example of FIG. 2, because the DHCP response message received by access network node 243 includes the IP address assigned to access network node 243 and the IP address of core network node 221, access network node 243 is configured to identify the two IP addresses based on the DHCP response message.

At 612, configuration information from the core network node can be received by the network node through a control-plane tunnel based on the address of the network node and the address of the core network node. For example, as a result of the exchange of discovery messages, the addresses of the network node and the core network node are available to the network node, the core network node, and/or other network devices coupled between the network node and the core network node. Thus, a control-plane tunnel connecting the network node with the core network node can be established. Furthermore, more configuration information can be sent from the core network node to the network node through the control-plane tunnel based on the addresses of the network node and the core network node, without intervention from a network administrator. The configuration information can include IP configuration information associated with the network node, information associated with establishing a data-plane tunnel between the network node and the core network node, etc.

In the example of FIG. 2, based on the IP addresses of access network node 243 and core network node 221, configuration information can be sent from core network node 221 to access network node 243 via a control-plane tunnel (e.g., shown as the tunnel represented by 22 in FIG. 2) connecting core network node 221 with access network node 243, without intervention from a network administrator. The configuration information can include, for example, information associated with establishing a data-plane tunnel (e.g., a MPLS tunnel, an Ethernet-over-layer-3 tunnel) between core network node 221 and access network node 243.

Figure 7:
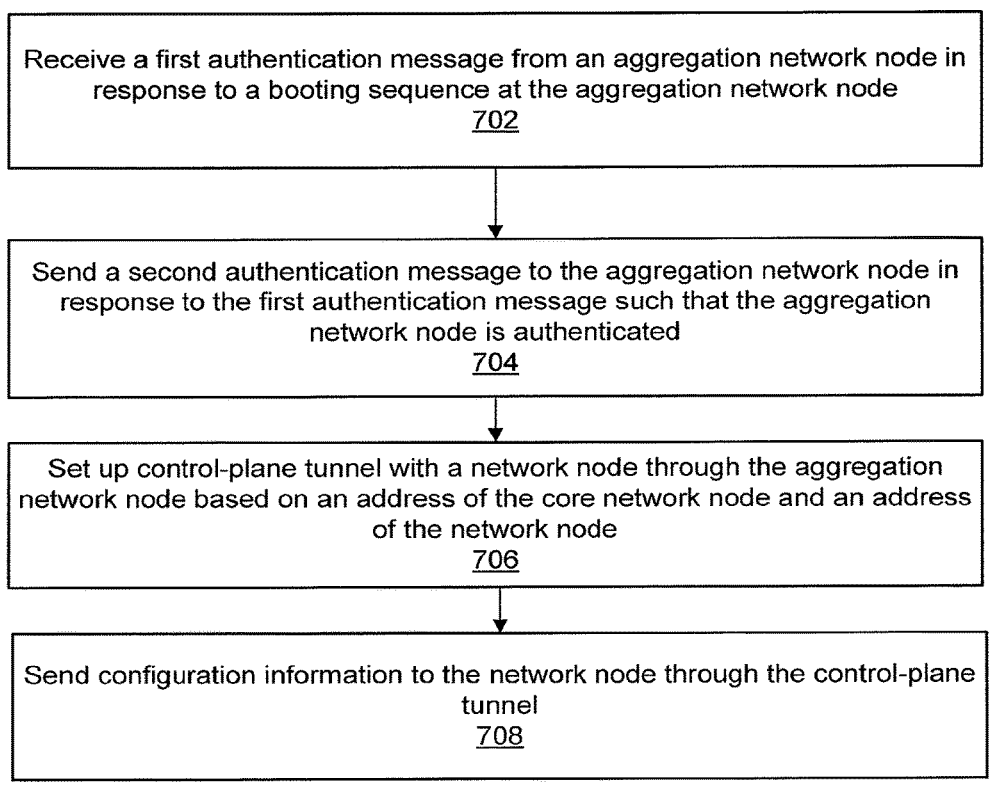
FIG. 7 is a flow chart of a method for authenticating an aggregation network node and tunneling configuration information through the aggregation network node, according to an embodiment.

FIG. 7 is a flow chart of a method for authenticating an aggregation network node and tunneling configuration information through the aggregation network node, according to an embodiment. At 702, a first authentication message from an aggregation network node can be received by a core network node in response to a booting sequence at the aggregation network node. For example, as a result of a booting sequence at an aggregation network node in a homogeneous enterprise network or a homogeneous portion of an enterprise network, the core network node can be configured to receive a first authentication message from an aggregation network node directly coupled to the core network node without intervention from a network administrator. The first authentication message requests the aggregation network node to be authenticated by an authentication server of the homogeneous enterprise network. In response to receiving the first authentication message, the core network node can forward the authentication message to an authentication server operatively coupled to the core network node.

In the example of FIG. 2, as described above, core network node 221 is configured to receive a first authentication message from aggregation network node 231 in response to a booting sequence at aggregation network node 231. Core network node 221 then forwards the first authentication message to an authentication server (not shown in FIG. 2) operatively coupled to core network node 221, which can authenticate aggregation network node 231 based on the first authentication message sent from aggregation network node 231.

At 704, a second authentication message can be sent from the core network node to the aggregation network node in response to the first authentication message such that the aggregation network node is authenticated. Specifically, the authentication server can authenticate the aggregation network node based on the first authentication message sent from the aggregation network node. As a result, the authentication server can generate and send a second authentication message to the core network node, which sends the second authentication message to the aggregation network node directly coupled to the core network node. Thus, after receiving the second authentication message, the aggregation network node can be authenticated based on the second authentication message, and allowed to access resources located on the homogeneous enterprise network.

In the example of FIG. 2, as described above, the authentication server authenticates aggregation network node 231 by sending a second authentication message to core network node 221, which sends the second authentication message to aggregation network node 231. As a result, aggregation network node 231 is authenticated based on the second authentication message received from core network node 221, and therefore allowed to access resources located on the homogeneous enterprise network 200.

At 706, the core network node sets up a control-plane tunnel with a network node through the aggregation network node based on an address of the core network node and an address of the network node. Specifically, after a network node (e.g., an access network node) is authenticated, auto-discovered, and discovering a core network node operatively coupled to the network node via the aggregation node, a control-plane tunnel connecting the network node with the core network node through the aggregation network node can be established.

In the example of FIG. 2, after access network node 243 is authenticated, auto-discovered (i.e., obtains an IP address), and discovers core network node 221 (i.e., identifies the IP address of core network node 221), a control-plane tunnel (e.g., shown as the tunnel represented by 22 in FIG. 2) connecting access network node 243 and core network node 221 can be established through aggregation network node 231.

At 708, configuration information can be sent from the core network node to the network node through the aggregation network node via the control-plane tunnel. After the control-plane tunnels is established, configuration information associated with configuring the network node can be sent from the core network node to the network node through the aggregation network node via the control-plane tunnel based on the addresses of the core network node and the network node.

In the example of FIG. 2, after the control-plane tunnel (e.g., shown as the tunnel represented by 22 in FIG. 2) is established connecting access network node 243 and core network node 221 through aggregation network node 231, configuration information associated with configuring access network node 243 can be sent from core network node 221 to access network node 243 via the tunnel through aggregation network node 231.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIG. 5 as control module 524 being included in core network node 500, in other embodiments, a control module can be separate from and operatively coupled to a core network node. In some embodiments, a control module can be located on a separate device that is operatively coupled to a core network node. In such an example, the control module can be configured to manage wired and/or wireless sessions and apply user policies to wired and/or wireless sessions by sending signals (e.g., control signals) to and receiving signals from the core network node. For example, the control module can send a control signal to an tunnel module in the core network node, instructing the tunnel module to encapsulate or decapsulate a received packet, according to a predetermined tunneling protocol (e.g., an Ethernet-over-layer-3 tunneling protocol, the MPLS protocol). For another example, the control module can send a control signal to a processor of the core network node, instructing the processor to compare information associated with a user session with data stored in a policy table within the core network node, such that an appropriate user policy can be determined and applied on the user session.

While shown and described above with respect to FIG. 1 as aggregation network nodes 131-132 with their associated access network nodes 141-144 and access points 151-152 comprising a pod, in other embodiments, a pod can include less than two or more than two aggregation network nodes and their associated access devices (e.g., access network nodes, access points). As described herein, a pod is defined as a collection of aggregation network nodes and associated access devices having a common connection to a redundant set of core network nodes. Furthermore, while shown and described above with respect to FIGS. 1 and 2 as a redundant set of core network nodes connected to a pod including two core network nodes, in other embodiments, such a redundant set of core network nodes can include more than two core network nodes. For example, a cluster of any number (e.g., 3, 4, 5, etc.) of core network nodes can be coupled to a pod of aggregation network nodes and their associated access devices. Each core network node in the cluster of core network nodes can function as a controller, a hop and/or a switch for the network devices included in the pod associated with the cluster of core network nodes.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A method, comprising:
discovering, at an aggregation network node, a plurality of network devices directly coupled to the aggregation network node, the plurality of network devices including a core network node and an access network node;
sending, from the aggregation network node and to the core network node and the access network node, a plurality of portions of incomplete network topology information, each portion of incomplete network topology information from the plurality of portions of incomplete network topology information including a list of network devices directly coupled to the aggregation network node;
receiving, at the aggregation network node, a first updated portion of incomplete network topology information from the core network node and a second updated portion of incomplete network topology information from the access network node, the first updated portion of incomplete network topology information being defined by the core network node based on (1) the plurality of portions of incomplete network topology information and (2) a network topology that was discovered by the core network node before the plurality of portions of incomplete network topology information was sent, the second updated portion of incomplete network topology information being defined by the access network node based on (1) the plurality of portions of incomplete network topology information and (2) a network topology that was discovered by the access network node before the plurality of portions of incomplete network topology was sent; and
updating complete network topology information stored at the aggregation network node based on the first updated portion of incomplete network topology information and the second updated portion of incomplete network topology information.

2. The method of claim 1, further comprising:
receiving at the aggregation network node a first authentication message;
sending from the aggregation network node and to the access network node a second authentication message in response to the first authentication message; and
sending control information from the core network node through the aggregation network node via a control-plane tunnel between (1) an access point that is coupled to the access network node and (2) the core network node.

3. The method of claim 1, further comprising:
sending a first authentication message to an access network node;
receiving a second authentication message from the access network node in response to the first authentication message; and
receiving control information from the core network node through the access network node and the aggregation network node from the plurality of network devices via a control-plane tunnel between an access point and the core network node.

4. The method of claim 1, further comprising:
sending a first plurality of topology messages to each network device from a subset of network devices from the plurality of network devices before receiving the incomplete network topology information from each network device from the subset of the plurality of network devices; and
automatically configuring, at an access point that is coupled to the access network node, with respect to a virtual local area network (VLAN) or a user policy based on a user that connects to the access point.

5. The method of claim 1, further comprising:
sending a first plurality of topology messages to each network device from a subset of network devices from the plurality of network devices before receiving the incomplete network topology information from each network device from the subset of the plurality of network devices;
receiving control information from the core network node; and
automatically configuring, at an access point that is coupled to the access network node, based on the control information and the updated complete network topology information.

6. The method of claim 1, further comprising:
sending a first plurality of routing messages to a set of network devices from the plurality of network devices;
receiving a second plurality of routing messages from the set of network devices;
receiving data-plane packets from the core network node through a data-plane tunnel based on the second plurality of routing messages.

7. The method of claim 1, wherein the core network node establishes at least one of (1) a wireless session with an access point that is coupled to the access network node or (2) a wired session with the access network node via a data plane tunnel.

8. A processor-readable non-transitory medium storing code representing instructions that when executed by a processor cause the processor to:

send, via a communications interface at a network node coupled to an access point via an access network node, a first plurality of topology messages to a set of network nodes from a plurality of network nodes, the first plurality of topology messages including an incomplete version of a network topology stored at the network node, the incomplete version of the network topology including a list of network devices directly coupled to the network node, the set of network nodes including a core network node and the access network node;

receive, via the communications interface, a second plurality of topology messages from the set of network nodes, each topology message from the second plurality of topology messages including an updated version of the network topology modified by the core network node and the access network node, the updated version of the network topology being generated based on (1) the incomplete version of the network topology stored at that network node and received by that network node, and (2) a version of the network topology that was discovered by the core network node before the incomplete version of the network topology information was received from the core network node and a version of the network topology that was discovered by the access network node before the incomplete network topology information was received from the access network node; and automatically modify the incomplete version of the network topology stored at the network node based on the second plurality of topology messages.

9. The processor-readable non-transitory medium of claim 8, wherein the network node is an aggregation network node, the code further storing code to cause the processor to:

set up a control-plane tunnel with the access network node through the aggregation network node based on an address of the core network node and an address of the access network node; and receive, via the communications interface, control information from the core network node through the control-plane tunnel.

10. The processor-readable non-transitory medium of claim 8, further storing code to cause the processor to:

set up a control-plane tunnel with the access network node through the network node based on an address of the core network node and an address of the access network node;

receive, via the communications interface, control information from the core network node through the control-plane tunnel; and receive, via the communications interface and after receiving the control information, data-plane packets through the network node via a data-plane tunnel.

11. The processor-readable non-transitory medium of claim 8, further storing code to cause the processor to:

receive an address of the core network node;

set up a control-plane tunnel with the access network node through the network node based on the address of the core network node and an address of the access network node; and receive, via the communications interface, control information from the core network node through the control-plane tunnel.

12. An apparatus, comprising:

a memory; and a processor operatively coupled to the memory, the processor configured to receive configuration information from a core network node via a control-plane tunnel, the processor configured to send a first set of network topology messages to a set of network nodes coupled to the processor without intervening network nodes, the first set of network topology messages including an incomplete version of a network topology stored at the memory, the set of network nodes including an access point and an aggregation network node, the processor configured to receive a second set of network topology messages from the set of network nodes, each network topology message in the second set of network topology messages including an incomplete version of the network topology stored at a network node from the set of network nodes, the incomplete version of the network topology stored at the aggregation network node including an incomplete version of the network topology received from the core network node that is directly coupled to the aggregation network node, the processor configured to define a complete network topology based on the second set of network topology messages, the processor configured to define at least one data-plane path to the core network node based on the complete network topology.

13. The apparatus of claim 12, wherein the processor is configured to authenticate, auto-discover and receive the configuration information without intervention from a network administrator.

14. The apparatus of claim 12, wherein the processor is configured to authenticate and auto-discover in response to a boot up sequence of the processor.

15. The apparatus of claim 12, wherein:

the processor is configured to automatically configure itself based on the configuration information and the complete network topology, the processor is configured to automatically configure itself with respect to a virtual local area network (VLAN) or a user policy based on a user that connects to a network node of the processor.

16. The apparatus of claim 12, wherein the processor is configured to receive configuration information from the core network node through the control-plane tunnel based on an address for a network node of the processor and an address of the core network node.

17. The apparatus of claim 12, wherein:

the processor is configured to send a first plurality of routing messages to a set of network nodes from the set of network nodes, the processor is configured to receive a second plurality of routing messages from the set of network nodes, the processor is configured to receive data-plane packets from the core network node through a data-plane tunnel based on the second plurality of routing messages.

18. The apparatus of claim 12, wherein the set of network nodes includes a plurality of wireless nodes and a plurality of wired nodes.

* * * * *